United States Patent
Ono et al.

(10) Patent No.: US 10,574,901 B2
(45) Date of Patent: Feb. 25, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventors: Tadayoshi Ono, Kawasaki (JP); Keisuke Matsuno, Kawasaki (JP); Taketoshi Kinoshita, Tokyo (JP); Akihito Shin, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/403,853

(22) Filed: May 6, 2019

(65) Prior Publication Data
US 2019/0364222 A1 Nov. 28, 2019

(30) Foreign Application Priority Data

May 23, 2018 (JP) ................. 2018-099016

(51) Int. Cl.
| | | |
|---|---|---|
| *H04N 5/232* | (2006.01) | |
| *H04N 5/243* | (2006.01) | |
| *H04N 5/235* | (2006.01) | |
| *G06T 5/00* | (2006.01) | |
| *H04N 7/01* | (2006.01) | |
| *H04N 5/57* | (2006.01) | |

(52) U.S. Cl.
CPC ............ *H04N 5/243* (2013.01); *G06T 5/007* (2013.01); *H04N 5/2351* (2013.01); *H04N 5/57* (2013.01); *H04N 7/01* (2013.01); *G06T 2200/24* (2013.01); *G06T 2207/20072* (2013.01); *G06T 2207/20092* (2013.01); *G06T 2207/20208* (2013.01)

(58) Field of Classification Search
CPC ................................................... H04N 5/23293
USPC ..................................................... 348/333.02
See application file for complete search history.

(56) References Cited

U.S. PATENT DOCUMENTS

| | | | | |
|---|---|---|---|---|
| 7,024,036 | B2 * | 4/2006 | Shinbata | G06T 5/009 |
| | | | | 348/254 |
| 8,570,394 | B1 * | 10/2013 | Maeng | H04N 5/235 |
| | | | | 348/221.1 |
| 2007/0291152 | A1 * | 12/2007 | Suekane | H04N 5/23293 |
| | | | | 348/333.02 |
| 2016/0239196 | A1 * | 8/2016 | Takahashi | H04N 5/23216 |
| 2018/0124305 | A1 * | 5/2018 | Kobayashi | H04N 5/23293 |

(Continued)

FOREIGN PATENT DOCUMENTS

JP 2017-139618 A 8/2017

*Primary Examiner* — Anthony J Daniels
(74) *Attorney, Agent, or Firm* — Cowan, Liebowitz & Latman, P.C.

(57) ABSTRACT

An image processing apparatus comprises: a conversion unit configured to convert a characteristic of an image signal; and a display control unit configured to generate information indicating a relationship of image signals before and after conversion is performed by the conversion unit, and cause a display to display the information indicating a relationship of image signals, wherein the display control unit generates the information indicating a relationship of image signals, so as to include information indicating a relationship of scales of signals before and after conversion and information indicating a relationship of signal values before and after conversion.

12 Claims, 17 Drawing Sheets

(56) References Cited

U.S. PATENT DOCUMENTS

2019/0182423 A1\* 6/2019 Gummadi .......... H04N 5/23245
2019/0287494 A1\* 9/2019 Yokota ................. H04N 5/57

\* cited by examiner

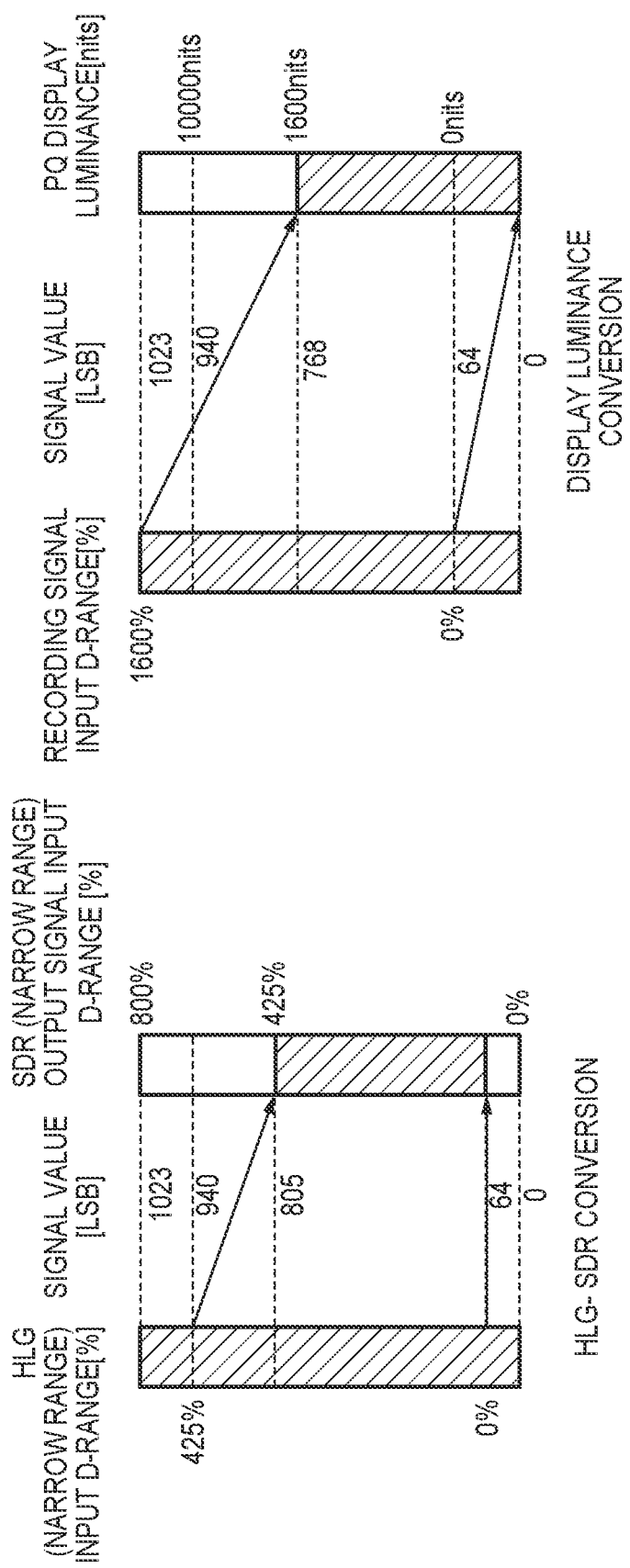

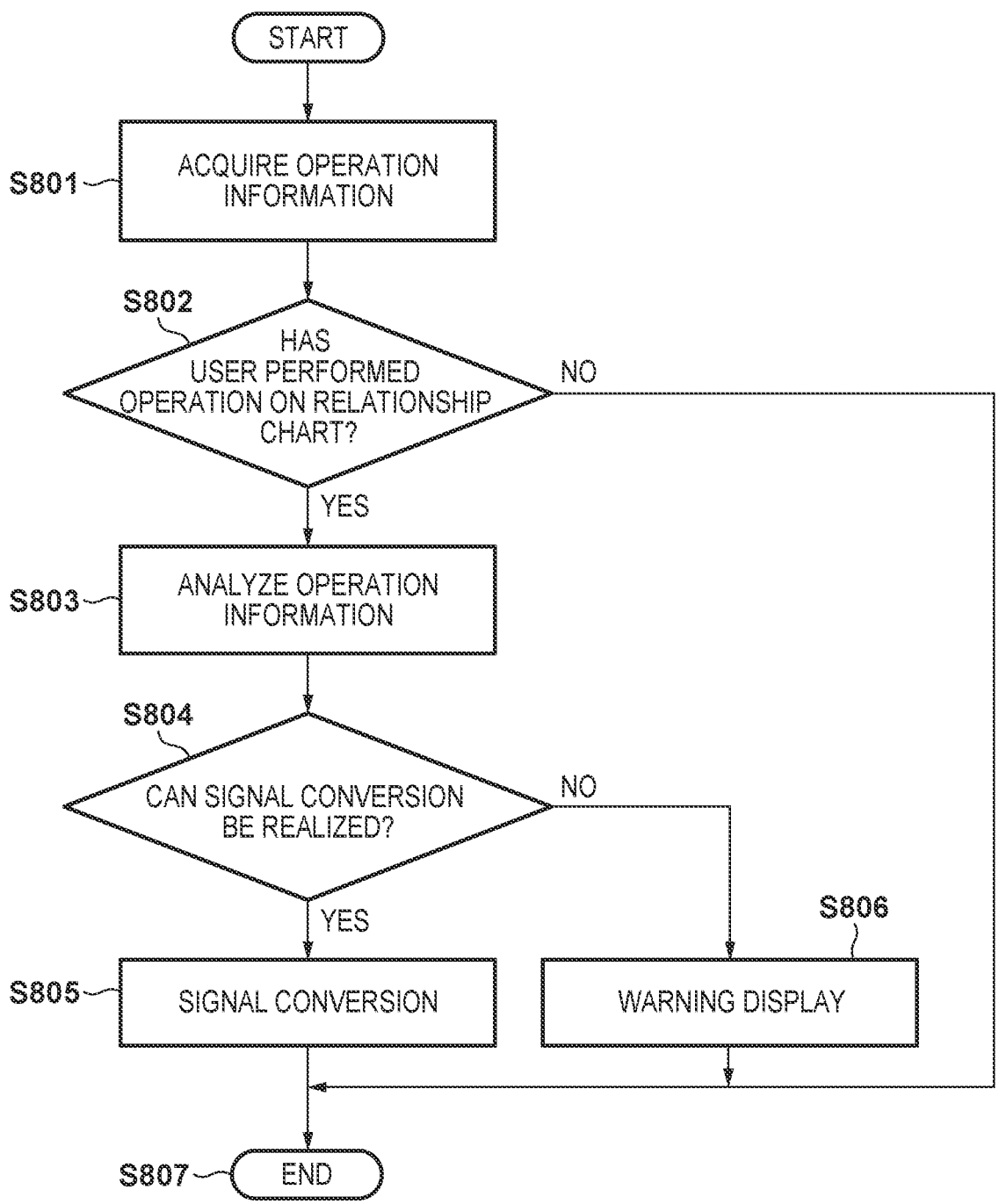

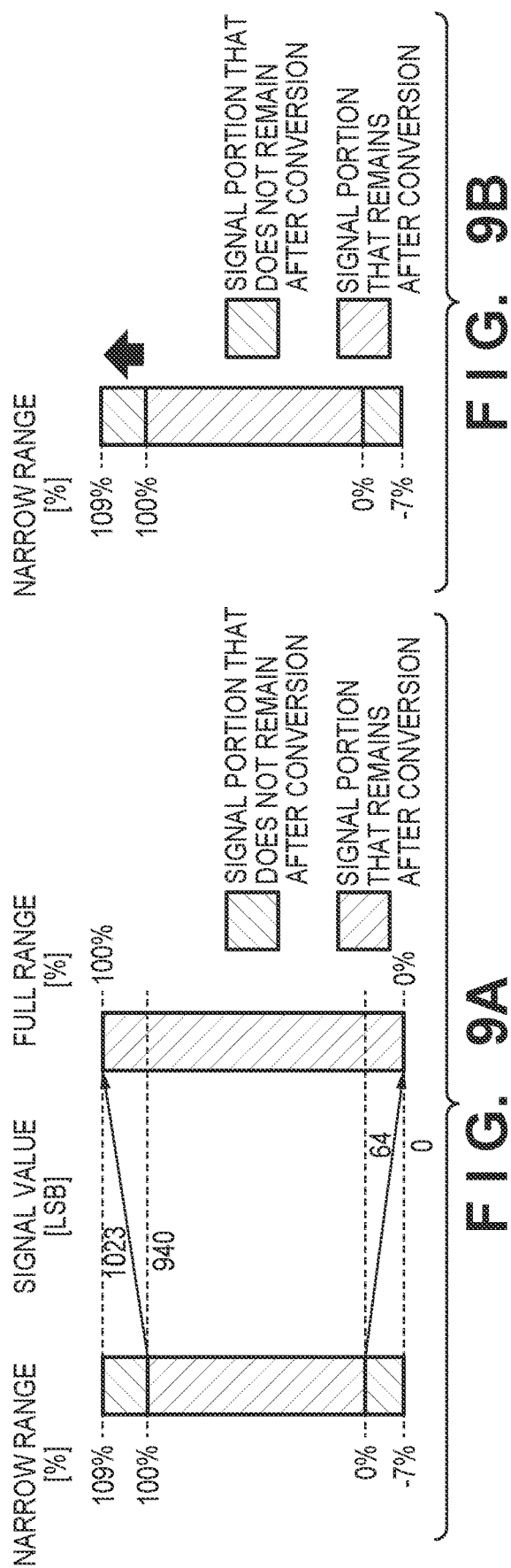
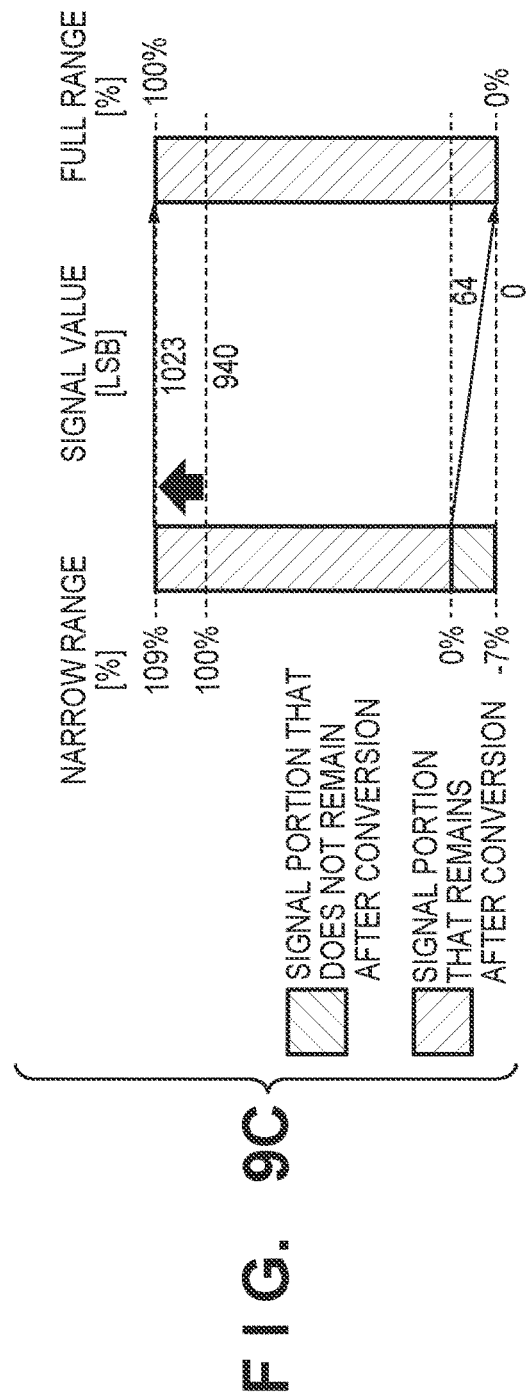
FIG. 9A
FIG. 9B
FIG. 9C

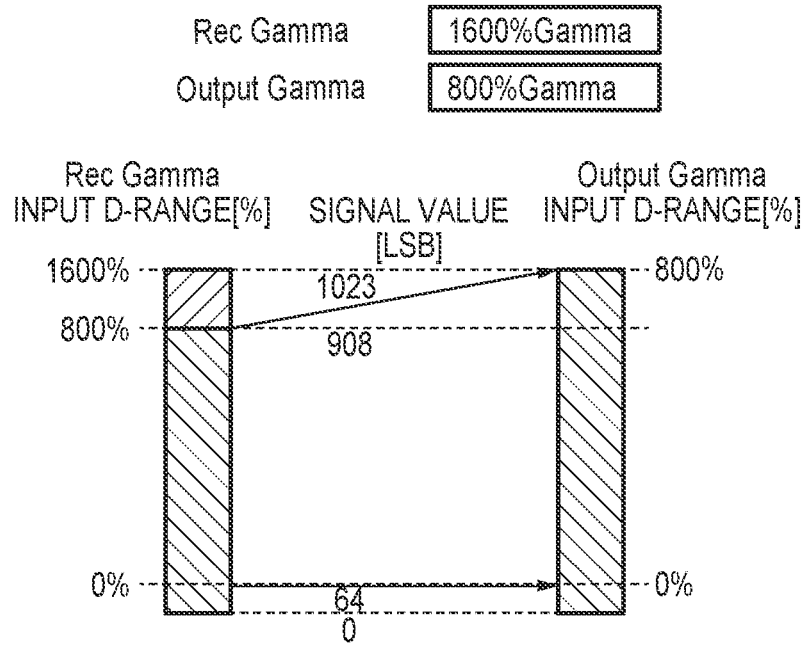
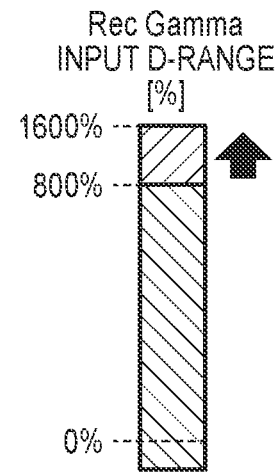
FIG. 11A          FIG. 11B
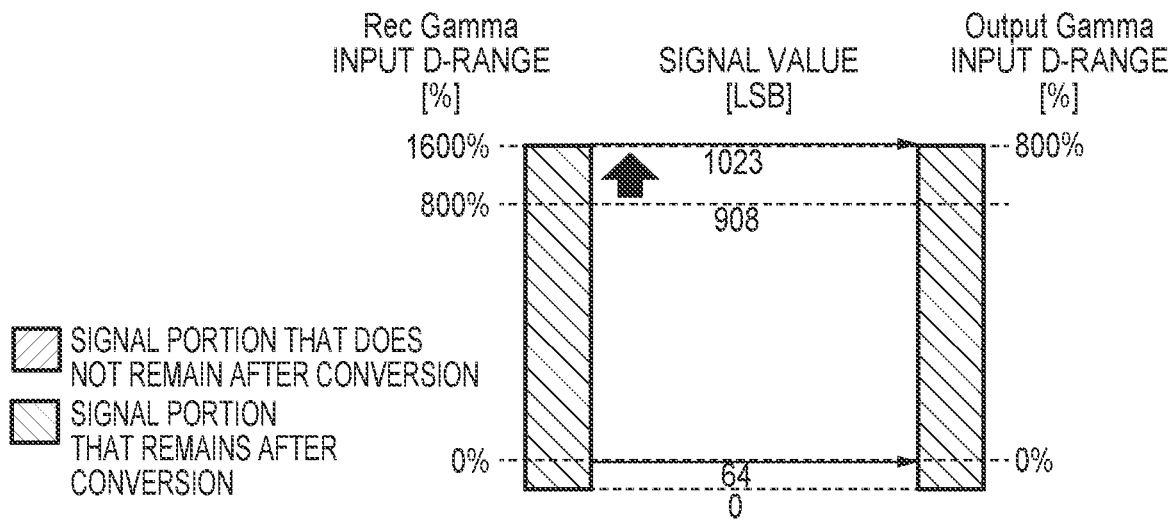
FIG. 11C

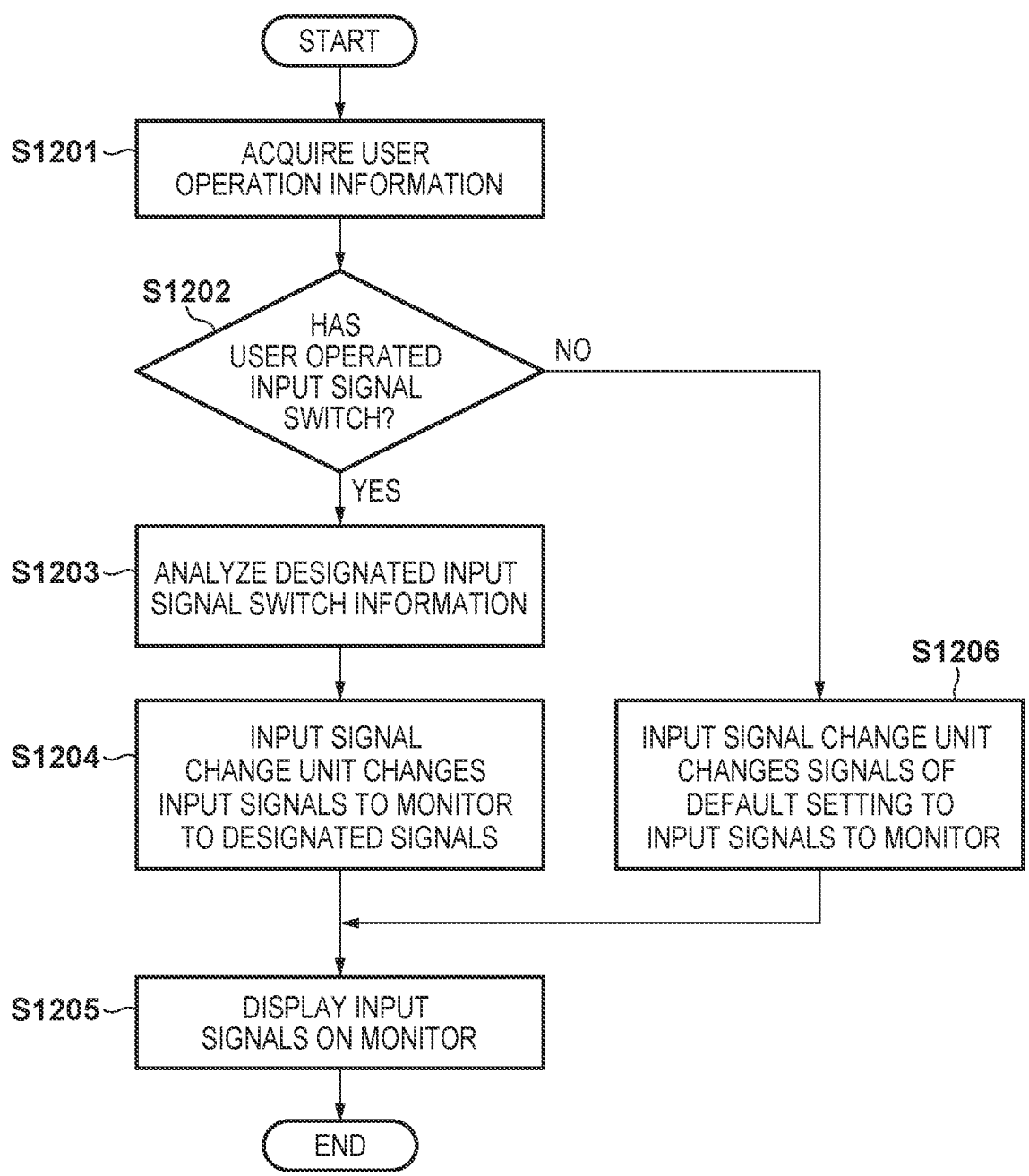

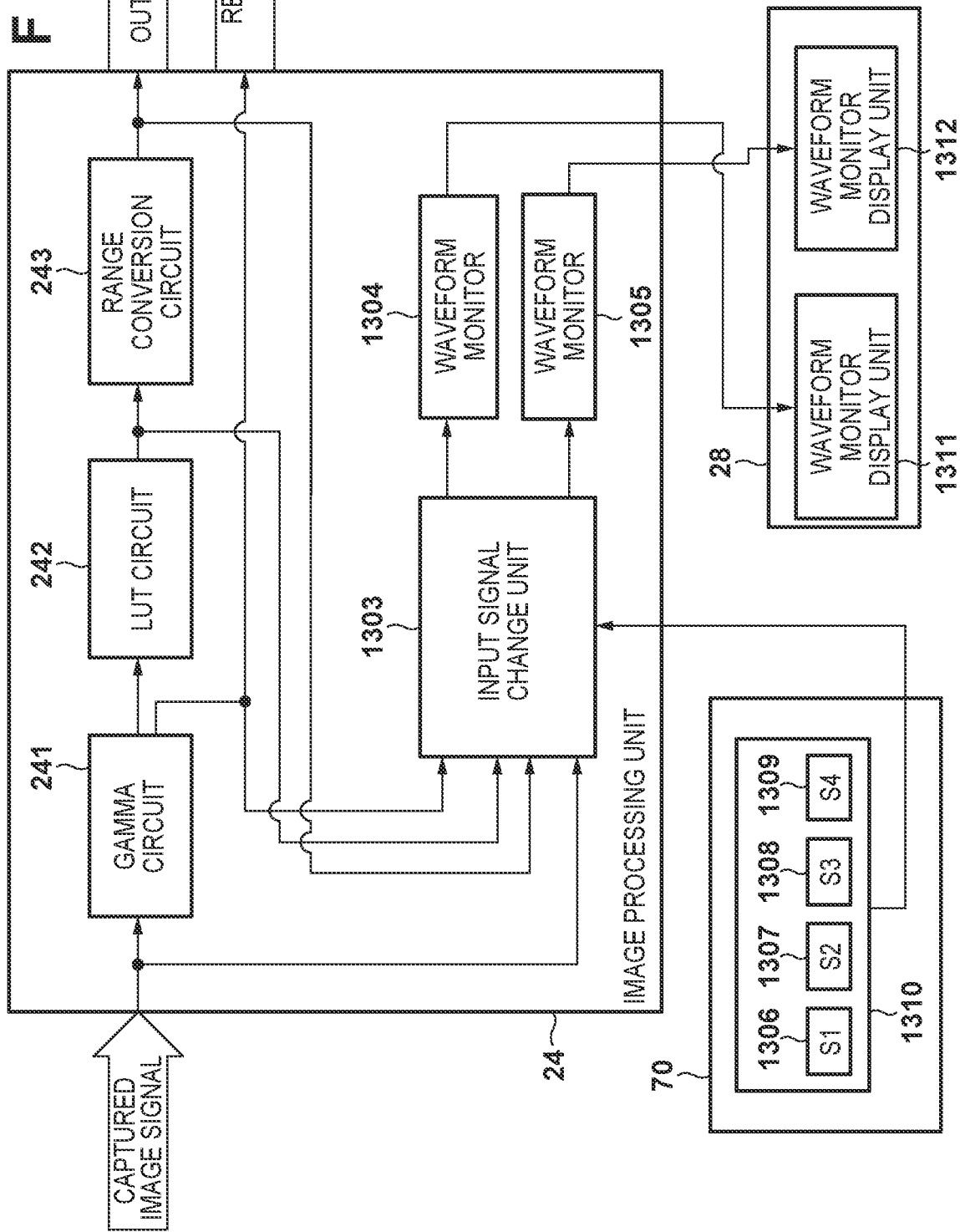

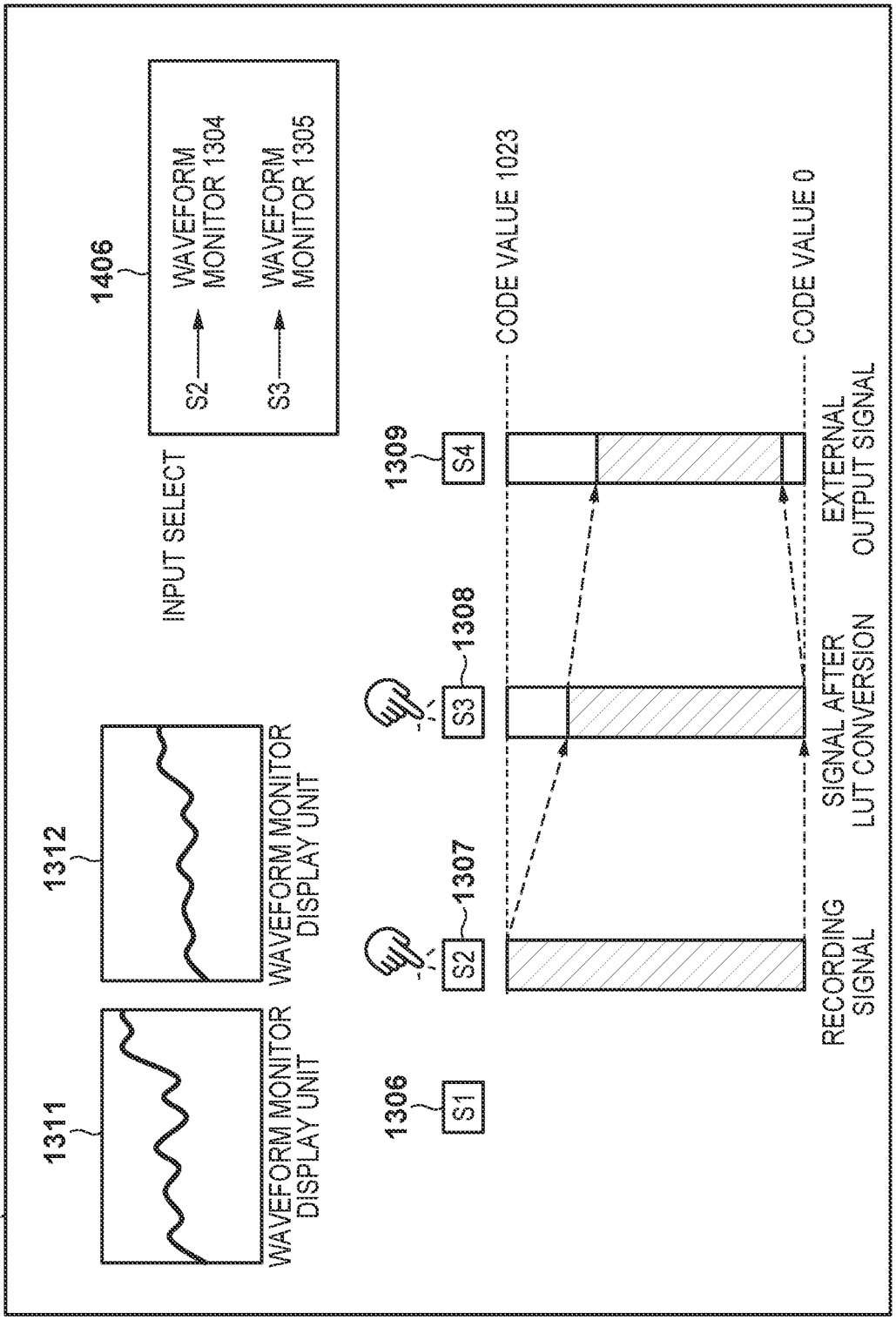

IMAGE PROCESSING APPARATUS, CONTROL METHOD THEREOF, AND STORAGE MEDIUM

BACKGROUND OF THE INVENTION

Field of the Invention

The present invention relates to an image processing apparatus, a control method thereof, and a storage medium.

Description of the Related Art

In some workflows that are known in recent years, the signal range of output signals from an image capturing apparatus is converted in accordance with a signal range that an external apparatus is compatible with, and the signals are then output, aside from signal range conversion of recording signals that are recorded in the image capturing apparatus.

In addition, in recent years, D-ranges (dynamic range) of display luminance of display apparatuses have diversified, and there exist display apparatuses that comply with an HDR (high dynamic range) standard and display apparatuses that comply only with an SDR (standard dynamic range) standard. Therefore, there is demand for workflows that include an HDR-SDR simultaneous recording/outputting function for converting signals of the HDR standard and generating signals of the SDR standard while generating signals of the HDR standard.

As a technique for realizing these workflows, Japanese Patent Laid-Open No. 2017-139618 discloses an image data generation apparatus that generates, from image signals of a wide D-range, image signals with gradation of a narrow D-range that a display device is compatible with, and displays the image signals with gradation of the narrow D-range.

In a case of realizing the above-described workflow, in a period until signals that are recorded in an image capturing apparatus are output from image capturing apparatus, image processing such as signal range conversion and gradation conversion is performed, and characteristics of signals that are output are different (according to a monitoring purpose, SDR standard compliance, and the like). Therefore, if it is not possible to correctly understand how signals that are output are generated with respect to the signals that are recorded, there are cases where setting is performed improperly and the D-range is narrowed more than necessary. In addition, there are also cases where the D-range of a generated image is less than the input D-range of the image capturing apparatus, the number of gradations of the generated image is small, and the like. Therefore, there is demand for a technique that makes it possible for the user to easily understand how signal conversion in the image capturing apparatus is performed.

SUMMARY OF THE INVENTION

The present disclosure has been made in consideration of the aforementioned issues, and realizes a technique that allows the user to more easily understand the relationship of image signals before and after signal conversion that is applied.

In order to solve the aforementioned problems, one aspect of the present disclosure provides an image processing apparatus comprising: a conversion unit configured to convert a characteristic of an image signal; and a display control unit configured to generate information indicating a relationship of image signals before and after conversion is performed by the conversion unit, and cause a display to display the information indicating a relationship of image signals, wherein the display control unit generates the information indicating a relationship of image signals, so as to include information indicating a relationship of scales of signals before and after conversion and information indicating a relationship of signal values before and after conversion.

Another aspect of the present disclosure provides a control method of an image processing apparatus comprising: converting a characteristic of an image signal; and performing display control for generating information indicating a relationship of image signals before and after conversion is performed in the converting, and causing a display to display the information indicating a relationship of image signals, wherein, in the display control, the information indicating a relationship of image signals is generated so as to include information indicating a relationship of scales of signals before and after conversion and information indicating a relationship of signal values before and after conversion.

Still another aspect of the present disclosure provides a non-transitory computer-readable storage medium storing a program for causing a computer to execute a control method of an image processing apparatus comprising: converting a characteristic of an image signal; and performing display control for generating information indicating a relationship of image signals before and after conversion is performed in the converting, and causing a display to display the information indicating a relationship of image signals; wherein, in the display control, the information indicating a relationship of image signals is generated so as to include information indicating a relationship of scales of signals before and after conversion and information indicating a relationship of signal values before and after conversion.

According to the present invention, it is possible for the user to more easily understand the relationship of image signals before and after conversion that is applied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A to 4D are graphs showing calculation examples of characteristics of signal conversion of image processing and the relationship before and after conversion.

FIG. 8 is a flowchart showing a series of operations related to processing for changing signal conversion in a third embodiment.

FIGS. 9A to 9C are diagrams illustrating an example of display change in a relationship chart in the third embodiment during an operation.

FIGS. 11A to 11C are diagrams illustrating a display example when changing a relationship chart in the third embodiment.

FIG. 12 is a flowchart showing signal display processing in a fourth embodiment.

FIG. 13 is a block diagram showing an exemplary function configuration of an image processing unit in the fourth embodiment.

FIG. 14 is a diagram illustrating a display example of a relationship chart in the fourth embodiment.

DESCRIPTION OF THE EMBODIMENTS

First Embodiment

An exemplary embodiment of the present invention will be described below in detail with reference to the drawings. Note that an example will be described below in which a digital camera that can convert captured image signals is used as an example of an image processing apparatus. However, this embodiment is not limited to a digital camera, and can also be applied to other devices that can convert captured images. For example, these devices may include mobile phones including smart phones, gaming devices, tablet terminals, watch-type and eyewear-type information terminals, medical devices, devices in monitoring systems, in-vehicle systems, and the like.

Configuration of Digital Camera

Figure 1:
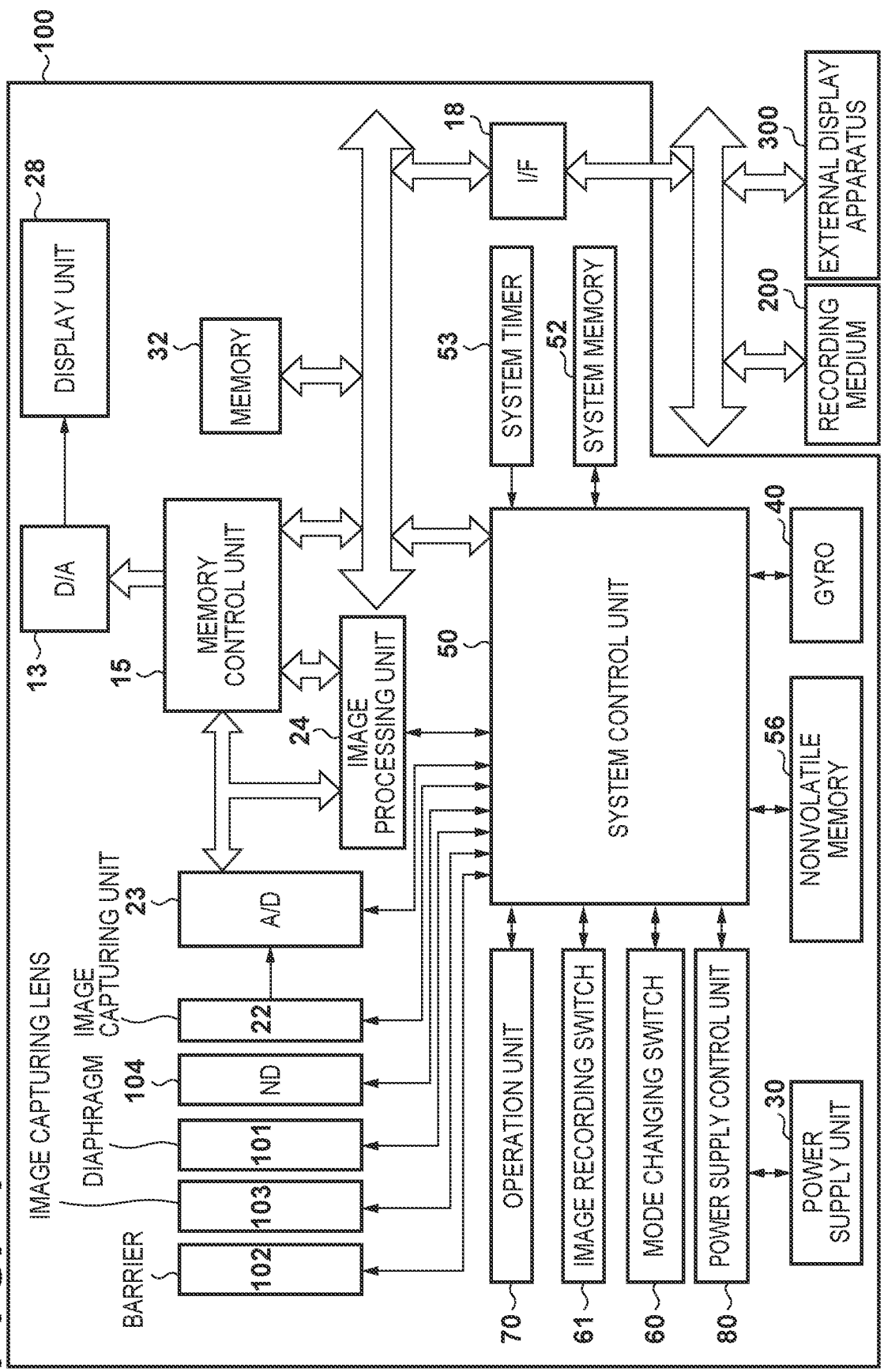
FIG. 1 is a block diagram showing an exemplary function configuration of a digital camera that is an example of an image processing apparatus in a first embodiment.

An exemplary function configuration of a digital camera 100 of this embodiment will be described with reference to FIG. 1. In FIG. 1, an image capturing lens 103 is constituted by a lens group that includes a zoom lens, a focus lens, and a shift lens, and forms a subject image onto an image capturing plane of an image capturing unit 22. A diaphragm 101 is a diaphragm used for adjusting the light amount. An ND (Neutral Density) filter 104 has a filter used for reducing the light amount. The image capturing unit 22 has an image sensor constituted by a CCD or CMOS element for converting an optical image into electrical signals, and the like. In addition, the image capturing unit 22 has functions for controlling charge accumulation of the image sensor using an electronic shutter, changing an analog gain, changing the readout speed, and the like, and outputs analog image signals. An A/D converter 23 converts analog signals that are output from the image capturing unit 22, into digital signals. A barrier 102 covers an image capturing system of the digital camera 100 that includes the image capturing lens 103, and thereby prevents the image capturing system that includes the image capturing lens 103, the diaphragm 101, and the image capturing unit 22 from being soiled and damaged.

An image processing unit 24 performs predetermined image processing on digital image signals (also simply referred to as image data) output from the A/D converter 23 or image data from a memory control unit 15. Examples of the predetermined image processing include pixel interpolation processing, resize processing such as reducing processing, processing for detecting luminance information, color information, a characteristic subject, and the like, color conversion processing, gamma correction processing, and processing for adding a digital gain. In addition, predetermined calculation processing that is based on captured image data is performed, and the calculation result is transmitted to a system control unit 50. The system control unit 50 performs exposure control, distance measurement control, white balance control, and the like based on the transmitted calculation result. Accordingly, AF (autofocus) processing, AE (automatic exposure) processing, AWB (automatic white balancing) processing, and the like of a TTL (through the lens) system are performed.

A gyro 40 detects movement and orientation change of the digital camera 100 caused by camera shake or the like. The system control unit 50 performs image stabilization by operating the shift lens of the image capturing lens 103 or causing the image processing unit 24 to shift the image, based on movement or the like detected by the gyro 40.

The memory control unit 15 controls writing of data to a memory 32 and reading of data from the memory 32. For example, the memory control unit 15 writes output data from the A/D converter 23 to the memory 32 directly or via the image processing unit 24.

The memory 32 stores image data acquired as a result of the A/D converter 23 converting, into digital data, an image captured by the image capturing unit 22, and image data to be displayed on a display unit 28. The memory 32 has a storage capacity sufficient for storing a moving image and sound of a predetermined time. The memory 32 also functions as a memory (video memory) for image display.

A D/A converter 13 converts data for image display stored in the memory 32 into analog signals, and supplies the analog signals to the display unit 28. In this manner, image data that is written in the memory 32 and is to be displayed is displayed on the display unit 28 via the D/A converter 13. The display unit 28 includes a display device constituted by an LCD and the like, and performs display that is based on the analog signals from the D/A converter 13, on the display device. As a result of image signals output from the image capturing unit 22 being sequentially displayed on the display unit 28 via the A/D converter 23 and the memory control unit 15, an electronic view finder is realized, and through-image display can be performed. In addition, the display unit 28 displays a relationship chart that will be described later, in accordance with display control that is performed by the system control unit 50. Note that the display unit 28 does not necessarily need to be included in the digital camera 100. Even if the display unit 28 is not included in the digital camera 100, it suffices for the digital camera 100 to include a display control unit (e.g., the system control unit 50) for controlling images to be displayed on that display unit or display contents.

A nonvolatile memory 56 is a memory capable of electrically erasing/recording data, and an EEPROM is used as the nonvolatile memory 56, for example. The nonvolatile memory 56 stores constants for operations of the system control unit 50, programs, and the like.

The system control unit 50 includes a CPU or MPU, and controls operations of various flowcharts, which will be described later and overall operations of the digital camera 100 by loading programs to a system memory 52, and executing the programs. The system memory 52 includes a RAM, for example. Constants and variables for operations of the system control unit 50, programs read out from the nonvolatile memory 56, and the like are loaded in the system memory 52. In addition, the system control unit 50 also performs display control by controlling the memory 32, the D/A converter 13, the display unit 28, and the like. A configuration may be adopted in which the system control unit 50 also has functions of the image processing unit 24, and performs calculation related to various types of image processing, in place of the image processing unit 24. A system timer 53 is a clocking unit that measures times used for various types of control in the digital camera 100, and the time of a built-in clock.

A mode changing switch 60, an image recording switch 61, and an operation unit 70 are operation unit for inputting various operation instructions to the system control unit 50. The mode changing switch 60 receives, from the user, an operation instruction to switch the operation mode of the system control unit 50 to one of a moving image recording mode, a still image recording mode, a playback mode, and the like. As modes included in the moving image recording mode and the still image recording mode, there are an automatic shooting mode, an automatic scene determination mode, a manual mode, various scene modes for configuring shooting settings for respective shooting scenes, a program AE mode, a custom mode, and the like. By operating the mode changing switch 60, it is possible to directly make a switch to one of these modes included in the moving image shooting mode. Alternatively, a configuration may be adopted in which after switching to the moving image shooting mode using the mode changing switch 60, a switch is made to one of these modes included in the moving image shooting mode, using another operation member. The image recording switch 61 receives an operation instruction to switch between a shooting stand-by state and a shooting state. When the image recording switch 61 is switched on, the system control unit 50 starts a series of operations from reading out signals from the image capturing unit 22 to writing moving image data to a recording medium 200.

As a result of, for example, selectively operating various function icons that are displayed on the display unit 28, the operation members of the operation unit 70 are each given a function for each scene as appropriate, and operate as various function buttons. Examples of the function buttons include an end button, a back button, an image scrolling button, a jump button, an aperture button, and an attribute change button. For example, when a menu button is pressed, a menu screen through which various settings can be made is displayed on the display unit 28. The user can instinctively make various settings using the menu screen displayed on the display unit 28, a cross key in the horizontal and the vertical directions, and a SET button. In addition, the operation unit 70 may include a touch panel.

A power supply control unit 80 is constituted by a battery detection circuit, a DC-DC converter, a switch circuit for switching a block to energize, and the like, and detects whether or not a battery is mounted, the type of the battery, and the battery remaining capacity. Also, the power supply control unit 80 controls the DC-DC converter based on the detection result and an instruction of the system control unit 50, and supplies a necessary voltage to constituent elements including the recording medium 200 for a necessary period. A power supply unit 30 is constituted by a primary battery such as an alkaline battery or a lithium battery, a secondary battery such as a NiCd battery, a NiMH battery, or a Li ion battery, an AC adapter, and the like.

An I/F 18 is an interface with the recording medium 200 such as a memory card or a hard disk and an external display apparatus 300, and functions as an output unit for outputting predetermined data from the digital camera 100 to the external display apparatus 300 or the like. The recording medium 200 is a recording medium such as a memory card for recording s shot image, and is constituted by a semiconductor memory, a magnetic disk, or the like. Note that the recording medium 200 may be configured to be removable.

The external display apparatus 300 receives, from the I/F 18, image data captured through the image capturing system and then processed by the image processing unit 24, and displays the image data after applying gamma correction for monitoring.

Figure 2:
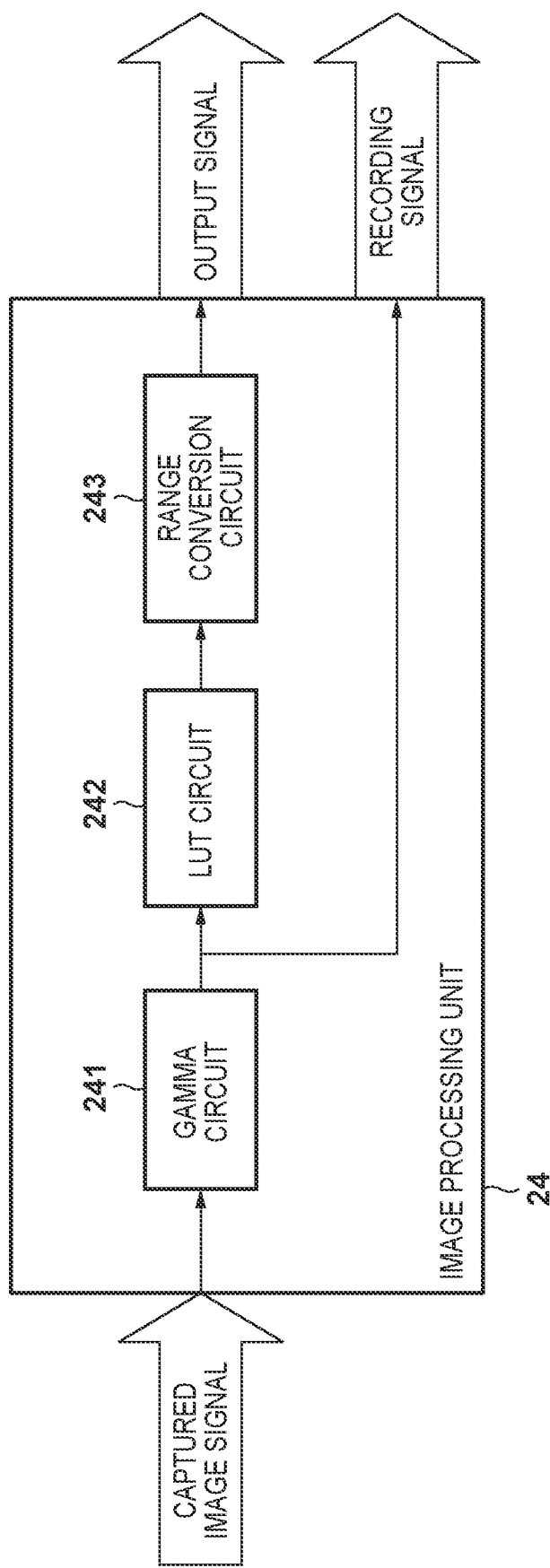
FIG. 2 is a block diagram showing an exemplary function configuration of an image processing unit in the first embodiment.

Next, the function configuration of the image processing unit 24 and processing for outputting image data for the external display apparatus 300 while outputting image data to be recorded, to which the image processing unit 24 applied a gamma characteristic in intermediate processing (also simply referred to as intermediate gamma) will be described with reference to FIG. 2. Note that the image data to be recorded is output using an intermediate gamma as the gamma characteristic for recording (also simply referred to as a recording gamma), in order to keep as large an amount of information as possible for post production. An intermediate gamma usually has a log characteristic, and thus signals that were subjected to gamma correction in accordance with the intermediate gamma have a low contrast, and are not suitable for viewing. Therefore, by performing image processing using a lookup table (hereinafter, also simply referred to as a LUT) on corrected signals and performing conversion to achieve a gradation that is close to the final image quality, signals that are easily monitored are output. In this manner, the image processing unit 24 functions as conversion unit that converts the characteristic of image signals.

Light from a subject passes through an optical system such as the image capturing lens 103 and the like, and is incident on the image capturing plane of the image capturing unit 22. The image capturing unit 22 generates image signals by converting an optical subject image that is incident into electrical signals, and the image processing unit 24 processes that image signals according to user settings.

A gamma circuit 241 acquires image signals, and applies a recording gamma to the image data. The signals to which the recording gamma was applied are recorded as recording signals to the recording medium 200 via the memory control unit 15 and the I/F 18. On the other hand, an LUT circuit 242 and a range conversion circuit 243 apply an LUT and range conversion to image data in order to generate output signals to be output. The signals to which the LUT and range conversion were applied are displayed as output signals on the display unit 28 via the memory control unit 15 and the D/A converter 13. In addition, these output signals are output from the I/F 18 to the external display apparatus 300.

Note that, in this embodiment, regarding image signals to be processed, information regarding a relationship chart for allowing the user to easily understand the relationship of image signals before and after signal conversion is generated, and is displayed on the display unit 28 for example.

Relationship Chart Generation Processing

Figure 3:
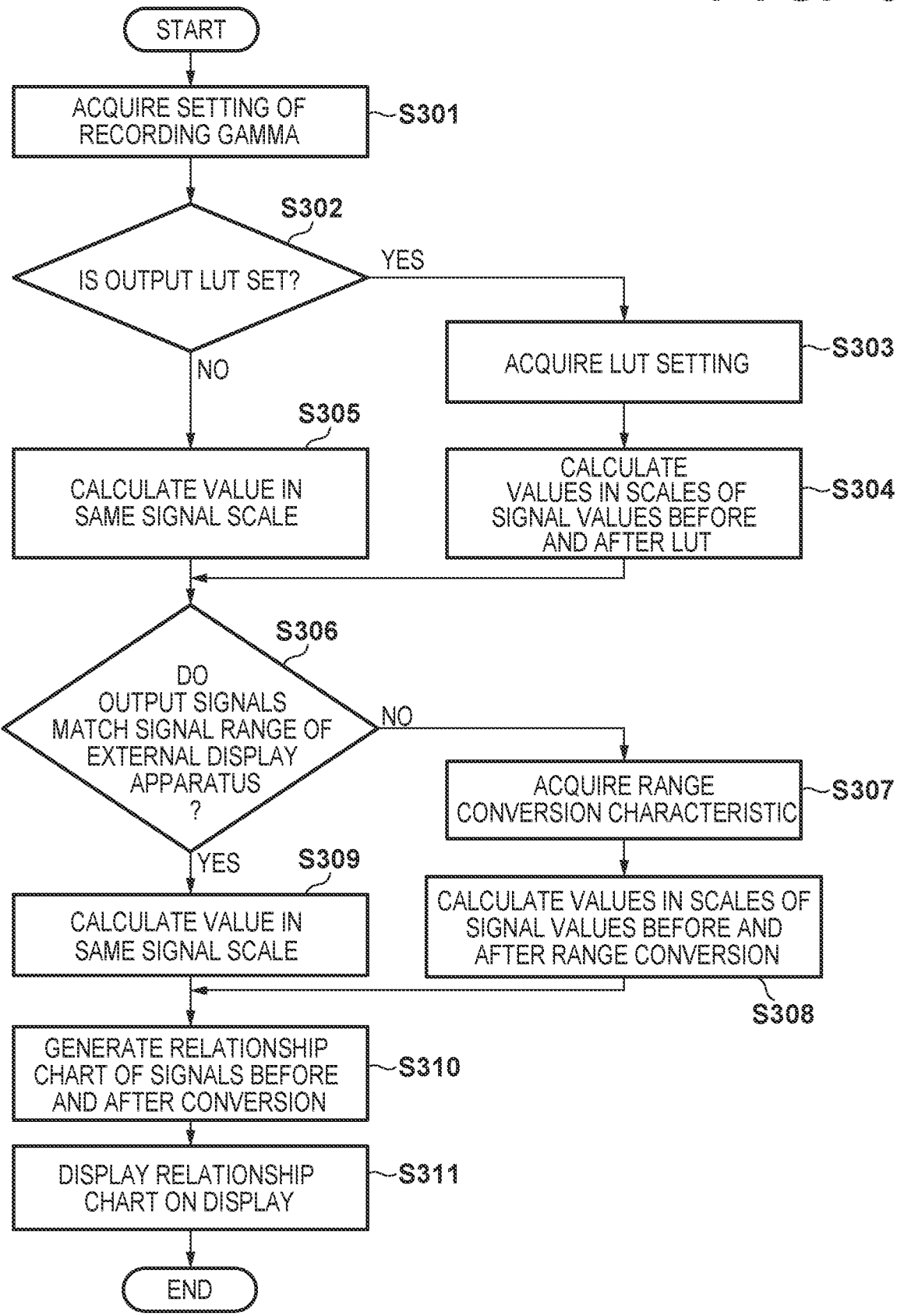
FIG. 3 is a flowchart showing a series of operations related to relationship chart generation processing in the first embodiment.

Next, a series of operations related to relationship chart generation processing will be described with reference to FIG. 3. Note that relationship chart generation processing is realized by the system control unit 50 loading a program stored in the nonvolatile memory 56 to a work region of the system memory 52 and executing the program, and controlling constituent elements of the digital camera 100 that includes the image processing unit 24.

In step S301, the system control unit 50 acquires a setting value of a recording gamma. Specifically, the system control unit 50 acquires, via the operation unit 70, a setting value of a recording gamma that is determined based on a user's operation instruction. Here, for example, the user sets an intermediate gamma as the recording gamma, in order to keep a large gradation range that can be adjusted at the time of grading after shooting. The intermediate gamma refers to a gamma characteristic according to which an input dynamic range (also simply referred to as an input D-range) is 1600%, for example.

In step S302, the system control unit 50 determines whether or not an output LUT is set. The recording gamma that has been set in step S301 is an intermediate gamma for keeping a large gradation range, and thus an image that has been subjected to gamma correction in accordance with the gamma has a low contrast. Therefore, an LUT for conversion for achieving a signal characteristic having a shape close to the final appearance is used. For example, if the setting value of the output LUT that has been set via the operation unit 70 is set in the system memory 52, the system control unit 50 determines that the output LUT is set, and the procedure advances to step S303, and otherwise the procedure advances to step S305.

In step S303, the system control unit 50 acquires the LUT setting. For example, in this embodiment, the LUT setting that has been set by the user is an LUT for converting signals having a characteristic of an intermediate gamma according to which the input D-range is 1600%, into signals having a characteristic of a viewing gamma (gamma characteristic for viewing) according to which the input D-range is 800%, for example. In this case, the system control unit 50 acquires a characteristic for conversion from the input D-range of 1600% to 800%. The signal conversion characteristic acquired here match the characteristic for signal conversion that is performed by the LUT circuit 242 shown in FIG. 2. Note that the system control unit 50 may acquire data related to the signal conversion characteristic from the image processing unit 24, or may record such data in the nonvolatile memory 56 in advance and read out the data from the nonvolatile memory 56.

Figure 4B:
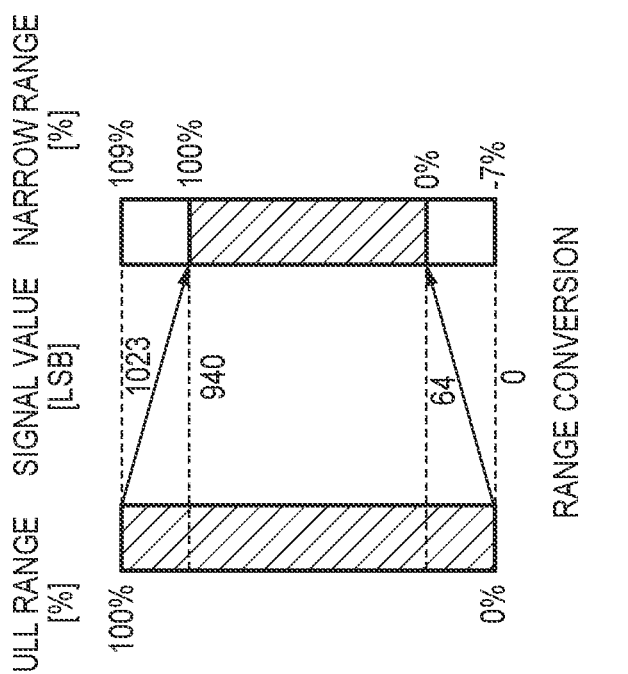
Figure 4A:
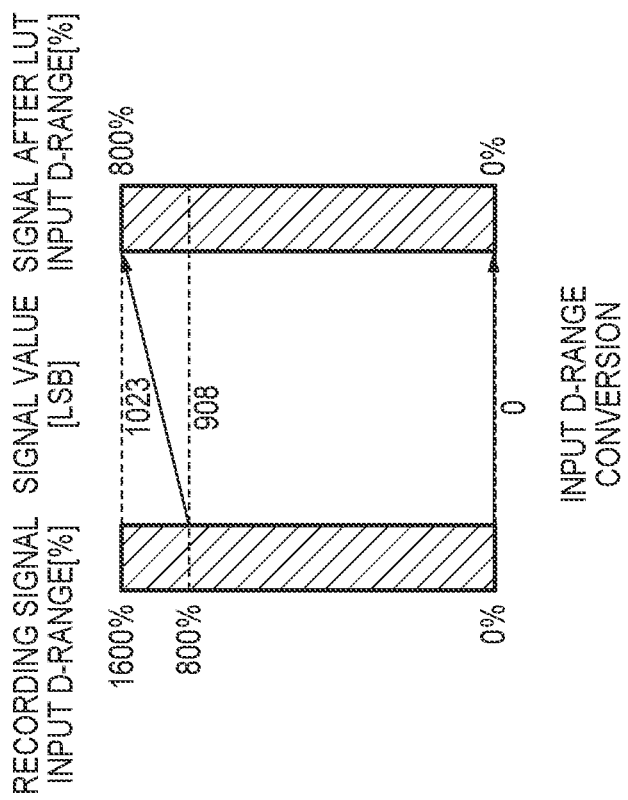

In step S304, the system control unit 50 calculates signal values for respective scales of signals before and after the LUT is applied. At this time, a scale corresponds to an input D-range included in the signals. The system control unit 50 calculates the relationship between signal values and the input D-ranges before and after conversion, based on the LUT characteristic acquired in step S303. FIG. 4A shows an example in which the calculation result is graphed. Note that, in the examples shown in FIGS. 4A to 4D, the bar graph shown on the left side indicates a scale of signals before conversion and a signal value in the scale. Also, the bar graph on the right side indicates a scale of signals after conversion and a signal value in the scale. Accordingly, FIGS. 4A to 4D include information indicating the relationship of scales of signals before and after conversion and information indicating the relationship of signal values before and after conversion. In the examples of this embodiment, signals have 10-bit signal values, and bar graphs indicate signal values of 0 to 1023. The numbers in the center indicate signal values of signals at positions indicated by broken lines, and scales on the left and right sides indicate input D-ranges equivalent to signal values before and after conversion. By using this LUT characteristic, signals of an input D-range of 1600% are converted into signals of an input D-range of 800%. Thus, in the example shown in FIG. 4A, the maximum signal value before conversion (the input D-range of 1600%) is indicated. In addition, it is indicated that a signal value of 908 equivalent to the input D-range of 800% before conversion corresponds to 1023 that is the maximum signal value after conversion.

In step S305, the system control unit 50 calculates a signal value in a signal scale that is the same for signals before the LUT is applied (in other words, image data to be recorded) and for signals after the LUT is applied, since the output LUT is not set and the signal value does not change.

In step S306, the system control unit 50 determines whether or not the signals after the LUT is applied match the signal range of the external display apparatus 300. A signal range in this embodiment is either a full range or a narrow range, for example. The full range is a signal range in which a 10-bit signal value corresponding to white is mapped to 1023, and a 10-bit signal value corresponding to black is mapped to 0. In addition, the narrow range is a signal range in which a signal value corresponding to white is mapped to 940, and a signal value corresponding to black is mapped to 64. Note that, in this embodiment, conversion of signals between the full range and narrow range will be described as an example, but conversion may be performed between signal ranges other than these.

Regarding setting a signal range of the external display apparatus 300, it is necessary to output signals of an appropriate signal range to the external display apparatus 300 connected to the digital camera 100, and thus, for example, the signal range is set by the user. For example, in the case where the signal range of the external display apparatus 300 has been set to the narrow range while the signal range after LUT conversion is the full range, the system control unit 50 determines that the two signal ranges do not match, and advances the procedure to step S307. On the other hand, for example, if the signal range of the external display apparatus 300 has been set to the full range, and the system control unit 50 determines that the signal range after LUT conversion and the signal range of the external display apparatus 300 that has been set match, the procedure advances to step S309. Note that, in this embodiment, as an example, a case has been described in which the signal range of the external display apparatus 300 is set by the user, but a configuration may be adopted in which communication is performed with the external display apparatus 300 (for example, through a connection terminal via the I/F 18) and the signal range setting is acquired.

In step S309, (since signal level conversion for matching the signal range after LUT conversion to the signal range of the external display apparatus 300 is not necessary,) the system control unit 50 calculates a signal value in a signal scale, which is same for the signals after LUT conversion and output signals.

In step S307, the system control unit 50 acquires signal range conversion characteristic. A conversion characteristic for converting a signal range before conversion into a signal range after conversion is selected based on a mismatch between the signal ranges determined in step S306. For example, if the range after LUT conversion is the full range, and the signal range setting of the external display apparatus 300 is the narrow range, conversion from the full range into narrow range is to be performed. The range conversion characteristic acquired here matches a characteristic according to which signal conversion is performed by the range conversion circuit 243 shown in FIG. 2.

In step S308, the system control unit 50 calculates signal values in signal scales before and after range conversion. The scales here refer to a signal in % in the full range regarding the signals after LUT and a signal in % in the narrow range regarding output signals. The correspondence relationship of signal values before and after conversion from the full range into the narrow range acquired in step S307 and the correspondence relationship between the full range (%) and narrow range (%) are calculated. FIG. 4B shows an example in which the calculation result in step S308 is graphed. In conversion from the full range into the narrow range, a maximum signal value of 1023 that is equivalent to 100% of the full range corresponds to a signal value of 940 that is equivalent to 100% of the narrow range after conversion. Similarly, a minimum signal value of 0 that is equivalent to 0% of the full range corresponds to a signal value of 64 that is equivalent to 0% of the narrow range after conversion.

Figure 5:
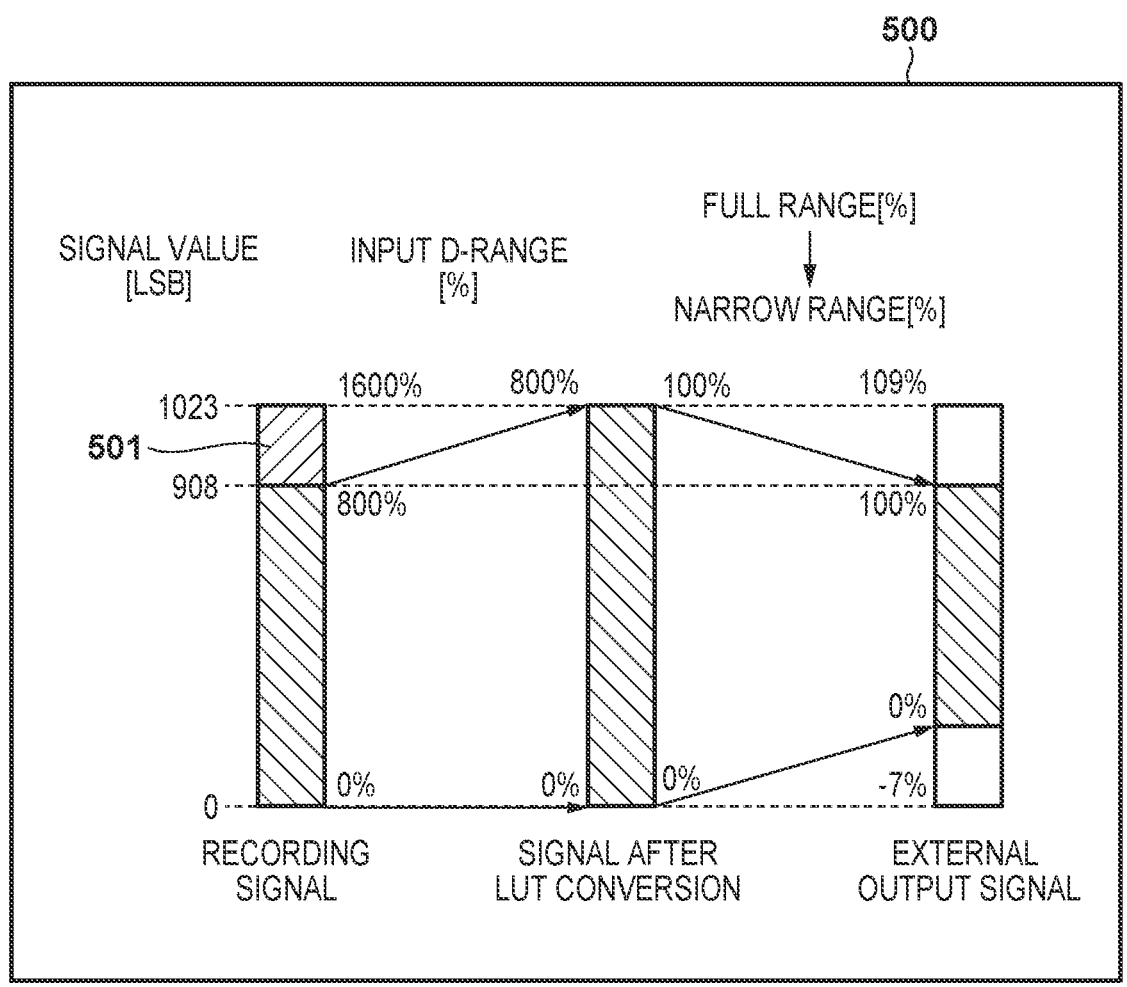
FIG. 5 is a diagram illustrating a display example of a relationship chart showing a transition of signal conversion in a digital camera.

In step S310, the system control unit 50 generates a relationship chart of the signal values before and after conversion that have been respectively calculated in steps S304 and S308. An example of the generated relationship chart (500) will be described with reference to FIG. 5. First, bar graphs shown in FIG. 5 respectively indicate recording signals, signals after LUT conversion, and external output signals in the stated order from the left. Numerical values (0 to 1023) on the left indicate signal values. These signal values are indicated by 10-bit signal values common to the signals. Numerical values between the graph for recording signals and the graph for signals after LUT conversion indicate input D-ranges (%), and indicate change in the input D-range included in signal values due to LUT conversion. A region 501 (a region hatched by lines inclined downward to the left and is shown in the bar graph on the left) is a region in which there is no signal value corresponding to a signal value after LUT conversion. The user can understand that there are signals that are lost due to LUT conversion, by visually recognizing this region 501. In addition, numerical values between the graph for signals after LUT conversion and the graph for external output signals indicate the full range (%) and narrow range (%). Here, signal range conversion is performed to convert the signals after LUT conversion into external output signals, and it is indicated that conversion from the full range into the narrow range has been performed. In this manner, the system control unit 50 generates a relationship chart that makes it possible to understand transition of the scale before and after conversion, transition of the signal value before and after conversion, and the correspondence relationship between the signal values in the scales before and after conversion, in image processing in the digital camera 100. In addition, the maximum signal value and an upper limit of the scale before conversion and the maximum signal value and an upper limit of the scale after conversion are shown in the relationship chart of this embodiment. Similarly, minimum signal values and lower limits of scales before and after conversion may be included. Furthermore, a region in which corresponding signal values are lost due to signal conversion, a region in which there is no corresponding value after signal conversion, and the like can be indicated. Note that, in this embodiment, a relationship chart in which bar graphs are used has been described as an example, but as long as similar information is included, a relationship chart of another format may be used.

In step S311, the system control unit 50 displays the relationship chart generated in step S310, on the display unit 28. The user can understand that, for example, the input D-range included in the recording signals decreases from 1600% to 800% due to LUT conversion, regarding the output signals, by checking this relationship chart. In addition, since the relationship chart indicates that the output signals are converted from the full range into the narrow range, and the signal values are compressed, the user can understand that the gradation range of the output signals decreases more than the recording signals. The system control unit 50 then ends the operations of this processing.

Note that, in the above embodiment, as example of signal conversion, conversion of image signals between different input D-ranges and conversion of image signals between different signal ranges have been described. However, the signal conversion may include signal conversion in another format. For example, conversion from HDR into SDR, conversion from signals of an input D-range into a display luminance defined by predetermined gradation range, and the like may be included, and relationships of such image signals before and after conversion are expressed as in FIG. 4C or 4D, for example.

As described above, in this embodiment, the relationship of image signals before and after signal conversion in the digital camera 100 is displayed as a visual relationship chart on a display unit. With such a configuration, the user can more easily understand the relationship of image signals before and after signal conversion that is applied. In addition, the relationship chart includes information indicating the relationship of scales of signals before and after conversion and information indicating the relationship of signal values before and after conversion. With such a configuration, the user can easily understand the influence of signal conversion that is difficult to understand only from a change in the signal value.

Second Embodiment

Next, a second embodiment will be described. In the first embodiment, the relationship of signal values before and after signal conversion is displayed as a relationship chart. On the other hand, in the case where the external display apparatus 300 that operates to be compatible with the HDR is connected and an HDR content is to be shot, it is necessary to understand the degree of brightness the final output will have, when performing the shooting. In this case, the user that visually recognizes the relationship chart described in the first embodiment can understand the maximum luminance that can be expressed, but there are cases where it is difficult to understand the degree of luminance that the luminance value of a face of a subject, the luminance value of a predetermined subject, or the like will represent. In addition, there are cases where it is difficult to understand the degree of luminance that a gray card that serves as a reference of exposure or a chart of predetermined reflectance will represent. In this embodiment, an example for allowing the user to easily understand the luminance value of a specific subject will be described. Note that the configuration of the digital camera 100 of this embodiment is substantially the same as the first embodiment. Therefore, the same reference numerals are assigned to the same configurations, and overlapping description is omitted, and a description will be given with a focus on differences.

Figure 6:
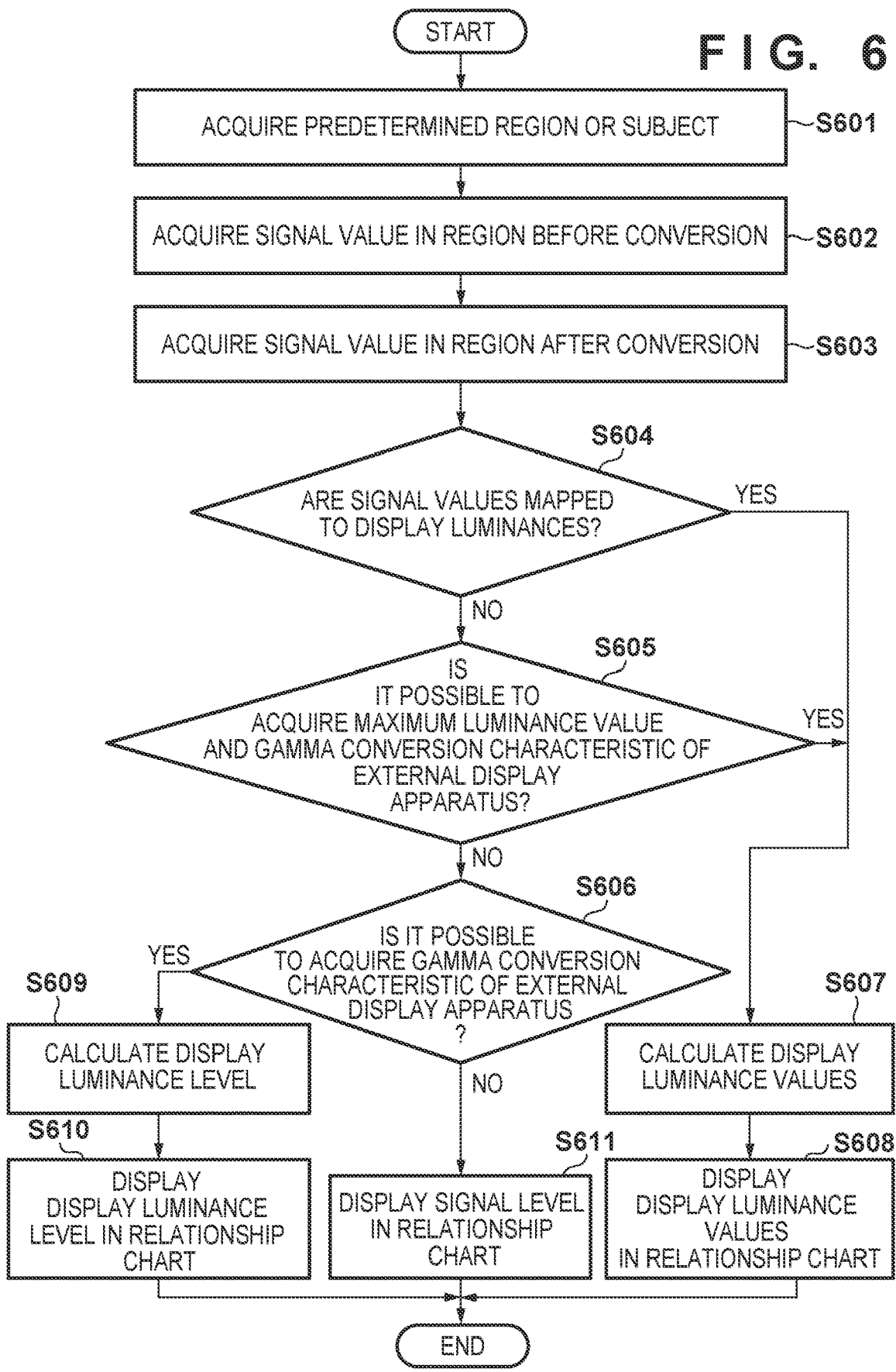
FIG. 6 is a flowchart showing a series of operations related to relationship chart generation processing in a second embodiment.

A series of operations related to relationship chart generation processing according to the second embodiment will be described with reference to FIG. 6. Note that the relationship chart generation processing according to this embodiment is also realized by the system control unit 50 loading a program stored in the nonvolatile memory 56 to a work region of the system memory 52 and executing the program, and controlling constituent elements of the digital camera 100 that include the image processing unit 24. In addition, the relationship chart generation processing according to this embodiment may be performed after the relationship chart generation processing according to the first embodiment ended, for example.

In step S601, the system control unit 50 acquires, via the operation unit 70, a region or a subject that is designated by the user, and the brightness in which the user desires to be aware of. For example, the user can designate a region or a subject displayed on the display unit 28 by touching the image, or select and designate a region using the cross key or the like, and the system control unit 50 acquires a region (designated region) designated by the user, based on a user operation. A configuration may be adopted in which, at this time, the user is prompted to select a face detected by the image processing unit 24 or a region of a characteristic subject such as a face or a light source, and thereby the system control unit 5 acquires a designated region.

In step S602, the system control unit 50 controls the image processing unit 24 so as to acquire signal value information in the designated region before signal conversion. The signal value information that is acquired here includes information regarding the largest value, the smallest value, the average value, the median value, and distribution of the signal values of the pixels in the designated region.

In step S603, the system control unit 50 calculates signal values after signal conversion, from the signal values acquired in step S602, in consideration of the characteristic of the signal conversion. Note that, if it is possible to directly acquire the signal values of the designated region from image information after signal conversion via the image processing unit 24, the system control unit 50 may acquire the signal values after conversion by performing detection processing on the image after conversion.

In step S604, the system control unit 50 determines whether or not the signal values after conversion are mapped to the luminance values when display is performed on the external display apparatus 300. If the luminance values that are displayed on the external display apparatus 300 are uniquely determined according to the signal values after conversion, the system control unit 50 advances the procedure to step S607. On the other hand, if the signal values after conversion and the luminance values that are displayed on the external display apparatus 300 are not determined uniquely, the procedure advances to step S605. For example, if the characteristic of the image after signal conversion is Perceptual Quantization (hereinafter, PQ) that is stipulated in Recommendation ITU-R BT.2100-1, the luminance values are uniquely determined from the signal values in accordance with an Electro-Optical Transfer Function (hereinafter, EOTF) characteristic. In such a case, the system control unit 50 advances the procedure to step S607. On the other hand, if the characteristic of the image after signal conversion is Hybrid Log-Gamma (hereinafter, HLG) stipulated in this standard, the luminance values vary in accordance with the maximum luminance value of the display device that outputs the image, and thus the luminance values are not determined uniquely. In such a case, the system control unit 50 advances the procedure to step S605.

In step S605, the system control unit 50 determines whether or not it is possible to acquire the maximum luminance value and the gamma conversion characteristic of the external display apparatus 300. For example, if the maximum luminance value and the gamma conversion characteristic of the external display apparatus 300 can be acquired or estimated, in cases such as where they are set via the operation unit 70, the system control unit 50 advances the procedure to step S607. Otherwise the procedure advances to step S606. Note that information regarding the maximum luminance value and the gamma conversion characteristic may be acquired by connecting the digital camera 100 to the external display apparatus 300. In addition, the maximum luminance value may be estimated as a representative luminance value such as 100 nit in the case of signals of SDR and 1000 nit in the case of signals of HDR, for example. In addition, the gamma conversion characteristic may be estimated as a gamma conversion characteristic that are envisioned based on the characteristic of output signals, for example, in the case of signals that have a characteristic of an HLG, gamma conversion is performed in accordance with the EOTF characteristic of an HLG.

In step S606, the system control unit 50 determines whether or not a gamma conversion characteristic can be acquired (or estimated) although a maximum luminance value is unknown. If it is determined that the gamma conversion characteristic can be acquired, the system control unit 50 advances the procedure to step S609, and if both a maximum luminance value and the gamma conversion characteristic cannot be acquired, the procedure advances to step S611.

Figure 7A:
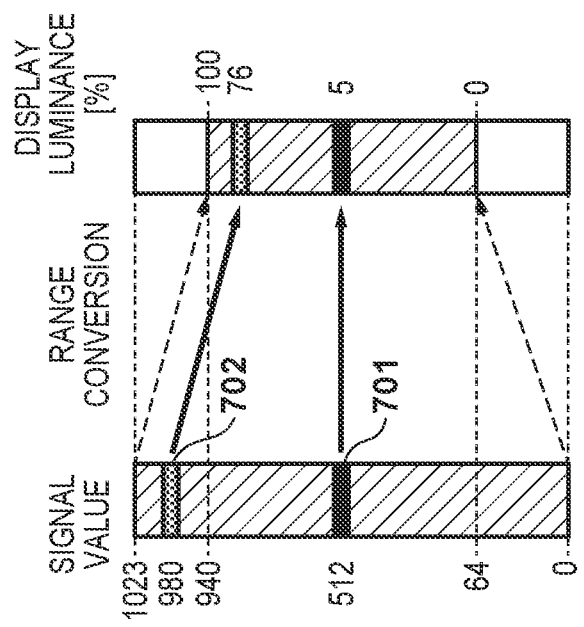
FIGS. 7A to 7D are diagrams illustrating a display example of a relationship chart in the second embodiment.

In step S607, the system control unit 50 calculates display luminance values in the external display apparatus 300 from the signal values. Furthermore, in step S608, the system control unit 50 displays, on the relationship chart shown in FIG. 7A, information indicating signal values before and after signal conversion, display luminance values, and transitions of the signal values and the display luminance values, regarding the designated region. In the example of FIG. 7A, a case where the signal value of a 10-bit signal before conversion is 512 (signal value display 701) and a case where the signal value is 980 (signal value display 702) are illustrated. In addition, in this example, a case where the signal conversion is range conversion is illustrated in order to simplify the description. For example, if the signal value before conversion is 512, the signal value changes to 502 by performing range conversion from the full range into the narrow range. At this time, if the gamma conversion characteristic of the external display apparatus 300 have a PQ characteristic, display at 92 nit is performed. In addition, if the signal value is 980 (the signal value display 702), display at 6713 nit is performed. The system control unit 50 then ends operation of this processing.

Figure 7B:
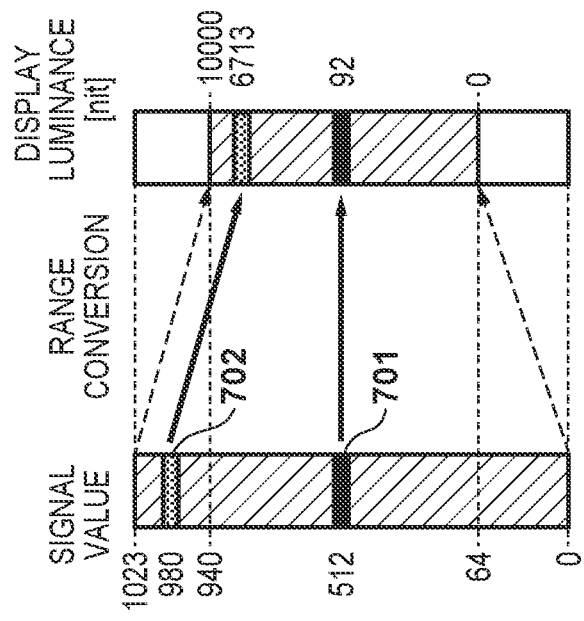

In step S609, the system control unit 50 calculates a display luminance level. The display luminance level indicates a ratio of display luminance to the maximum luminance of the external display apparatus 300. The system control unit 50 calculates a display luminance level from the signal values in consideration of the gamma conversion characteristic. In step S610, the system control unit 50 displays, on the relationship chart shown in FIG. 7B, information indicating the signal values before and after signal conversion, the value of the display luminance level, and a transition thereof due to conversion, using the calculated display luminance level. For example, if the signal value of a 10-bit signal before conversion is 512 (the signal value display 701), the signal value changes to 502 by performing range conversion from the full range into the narrow range. In addition, the display luminance is equivalent to 5% of the maximum luminance of the external display apparatus 300 due to the gamma conversion characteristic of the external display apparatus 300. In addition, if the signal value is 980 (the signal value display 702), the display luminance is equivalent to 76% of the maximum luminance of the external display apparatus 300. The system control unit 50 then ends the operations of this processing.

Figure 7C:
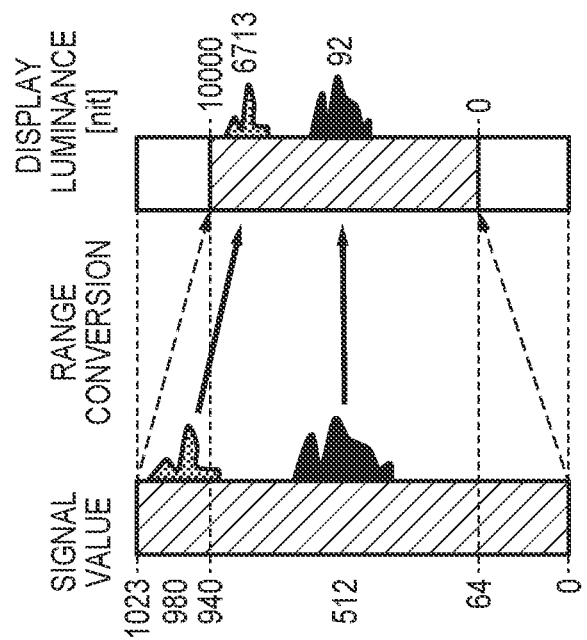
Figure 7D:
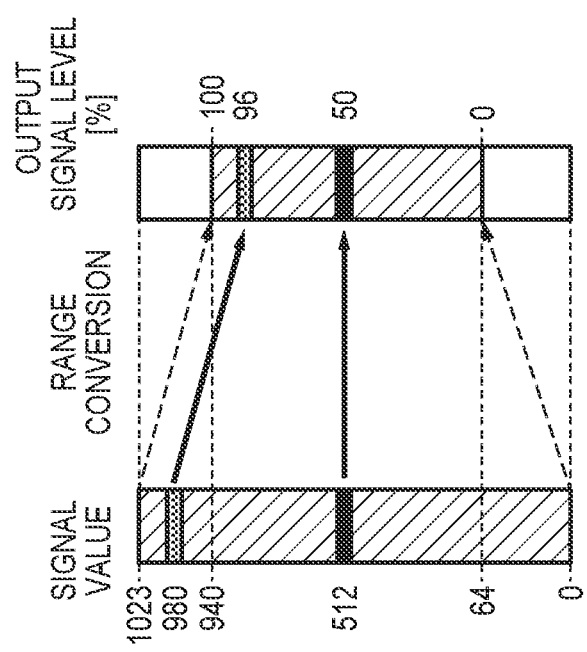

In step S611, since the system control unit 50 cannot calculate a value related to the display luminance, an output signal level in which the range of output signals is taken into consideration based on the signal values is indicated in the relationship chart as shown in FIG. 7C. In addition, if the system control unit 50 has acquired a distribution in the region in step S602, the state of distribution of signal values and display luminance may be indicated on the relationship chart as shown in FIG. 7D. At this time, information regarding the largest value, the smallest value, the most frequent value, and the like may also be added at the same time. The system control unit 50 then ends the operations of this processing.

Note that, when luminance values of a plurality of regions are displayed as shown in FIGS. 7A to 7D, it may be made easy to distinguish the regions by changing the colors and shapes of the regions. Also, it may be made clear regions in an image in which change in luminance is indicated, by superimposing display of similar colors and shapes in corresponding regions in the image as well at the same time.

In addition, in this embodiment, the user designates a region or a subject whose luminance the user desires to be aware of, in step S601. However, there are also cases where the degree of brightness at which an object having an index that serves as a reference of exposure is displayed on the external display apparatus 300, instead of the luminance of a specific subject, is desired to be aware of. In this case, instead of selecting a predetermined region or subject in step S601, the system control unit 50 may allow the user to select an index that serves as a reference of exposure such as 18% gray or 90% white, on the UI. In addition, information regarding the signal value of the index selected by the user, display luminance, and the like may be displayed on the relationship chart.

As described above, in this embodiment, a desired region or subject (or an index that serves as a reference of exposure) in an image whose luminance is desired to be aware of can be designated by the user, and a display luminance value, a display luminance level, and the like corresponding to the luminance (or the index) of the designated region are displayed. With such a configuration, in the case where image processing until display is performed on an output device is performed, the user can easily recognize a change in the designated target.

Third Embodiment

Next, a third embodiment will be described. There are cases where, when the user checks the above-described relationship chart, it is difficult to determine what conversion is to be selected in order to achieve output signals desired by the user. In this embodiment, an example of processing in which the user changes signal conversion based on a relationship chart to achieve desired output, in such a case, will be described. Note that the configuration of the digital camera 100 of this embodiment is substantially the same as the first embodiment. Note that the operation unit 70 can acquire an operation related to the relationship chart that is displayed on the display unit 28. In addition, a series of operations until the relationship chart is displayed on the display unit 28 is also similar to that in the first embodiment. Therefore, the same reference numerals are assigned to the same configurations, overlapping description is omitted, and description will be given with a focus on differences.

Processing for changing signal conversion according to this embodiment will be described with reference to FIG. 8. Note that this processing for changing signal conversion is realized by the system control unit 50 loading a program stored in the nonvolatile memory 56 to a work region of the system memory 52 and executing the program, and controlling constituent elements of the digital camera 100 including the image processing unit 24. In addition, this processing is started after a relationship chart is displayed through the relationship chart generation processing described in the first embodiment.

In step S801, the system control unit 50 acquires an operation performed on the operation unit 70 by the user, as operation information. In step S802, the system control unit 50 determines whether or not the user has performed an operation on the relationship chart, by analyzing the acquired operation information. If it is determined that an operation has not been performed on the relationship chart, for example, in a case of a menu operation other than that, the system control unit 50 ends this processing. On the other hand, if it is determined, based on the acquired operation information, that the user has performed an operation on the relationship chart, the system control unit 50 analyzes a signal conversion content based on the operation information. Here, information regarding the operation on the relationship chart includes a content of the operation on the relationship chart, the state of the relationship chart changed by the user operation, and the like, and any information regarding the operation on the relationship chart may be included.

For example, assume that the system control unit 50 displays, on the display unit 28, a relationship chart when converting signals represented as a narrow range (%) as shown in FIG. 9A into signals of a full range (%). In this relationship chart, the user performs an operation of changing the gradation characteristic of image signals before conversion (or after conversion). Specifically, assume that the user performs an operation for widening a signal portion that remains after conversion, so as to maintain, after conversion, signals of a region of 100% or more of the signals before conversion as shown in FIG. 9B. Accordingly, if the relationship chart is changed to the relationship chart as shown in FIG. 9C in which the signal portion before conversion is changed, the system control unit 50 acquires a signal conversion content for converting signals whose signal values before conversion are 64 to 940 into signals whose signal values are 0 to 1023.

In step S804, the system control unit 50 determines whether or not the signal conversion content analyzed in step S803 represents signal conversion that can be realized by the image processing unit 24. The system control unit 50 references a table or the like in which ranges that can be converted by the image processing unit 24 and the like are recorded in advance, for example, and determines whether or not the image processing unit 24 can cope with the signal conversion. In addition, besides the determination on whether or not the image processing unit 24 can cope with the signal conversion, whether or not the signal conversion can be coped with using a combination of settings related to signal conversion provided in the digital camera 100 may be further determined. If the system control unit 50 determines that the signal conversion content can be realized, the procedure advances to step S805, and if it is determined that the signal conversion content cannot be realized, the procedure advances to step S806.

Figure 10:
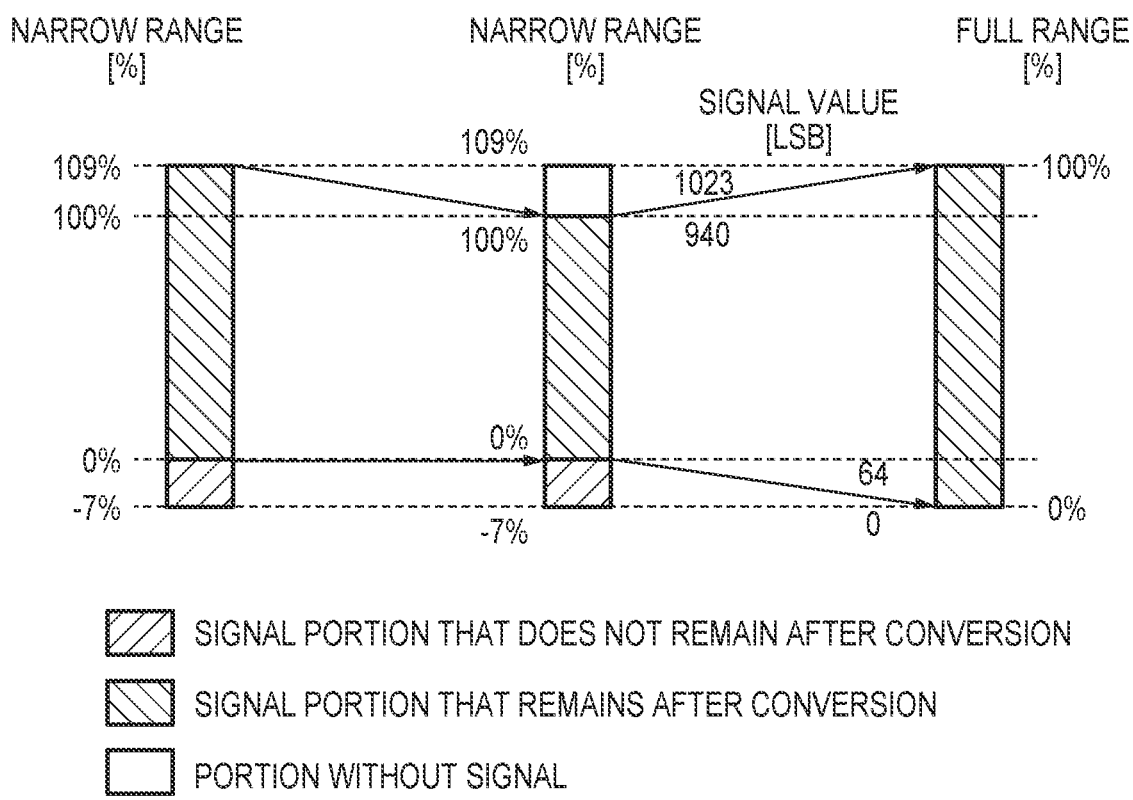
FIG. 10 is a diagram illustrating a display example of a relationship chart including intermediate signals in the third embodiment.

In step S805, the system control unit 50 causes the image processing unit 24 to change the conversion operation in the image processing unit 24 based on the analyzed signal conversion content, and to execute changed signal conversion. In addition, the system control unit 50 displays, on the display unit 28, the relationship of signal values resulting from the changed signal conversion. The system control unit 50 may display a relationship chart as shown in FIG. 10, for example. In the example shown in FIG. 10, a case is illustrated in which, when converting signals of 0% to 109% of the narrow range into signals of 0% to 100% of the full range, it is necessary to compress the signals to 0% to 100% of the narrow range for the convenience of the system. If it is necessary to perform signal conversion a plurality of times in this manner, intermediate signals may be displayed as a relationship chart. Furthermore, a range of signals that are affected by the signal conversion in step S805 regarding signals before the user performs an operation on the relationship chart may be displayed on the display unit 28. In addition, assume that the relationship chart of input D-ranges of a recording gamma (RecGamma) and an output gamma (OutputGamma) as shown in FIG. 11A is displayed on the display unit 28. In the case where the user performs an operation on this relationship chart so as to maintain, after conversion, the input D-range of RecGamma up to signals of 1600% as shown in FIG. 11B, the system control unit 50 displays the relationship chart shown in FIG. 11C, for example. In signal conversion processing of the image processing unit 24, in the case of confining a portion of 800 to 1600% of the input range in a range up to 800% through processing using Knee, setting of the used Knee may be additionally displayed on the display unit 28 as indicated by a region 1101. The system control unit 50 then ends the operations of this processing.

In step S806, since it has been determined in step S804 that the signal conversion related to the operation information cannot be realized, the system control unit 50 displays, on the display unit 28, a warning to the user that a signal conversion related to the operation content cannot be realized. Note that the system control unit 50 does not only display a warning, but may also restore the relationship chart to a state before the user operation, present signal conversion that is nearly realizable, and the like. The system control unit 50 then ends the operations of this processing.

As described above, in this embodiment, the content of a user operation on the relationship chart for changing the gradation characteristic of image signals before or after conversion is acquired, and a conversion operation is changed based on the acquired operation content. In addition, a relationship chart that is based on the changed conversion operation is displayed. With such a configuration, the user can intuitively perform operations of signal conversion, and without the user performing complicated calculation of signal conversion, it is possible to obtain output as intended. In addition, by visualizing settings of signal conversion changed by an operation, it is possible to inform the user of which setting is to be changed and how to change the setting, from this on.

Fourth Embodiment

Furthermore, a fourth embodiment will be described. It is envisioned that, after the user checks the above-described relationship chart, signals after signal conversion are output to an external output terminal such as an HDMI (registered trademark) or an SDI or a waveform monitor, and the signals are checked. However, if a plurality of signal conversions can be performed in the digital camera 100, there are cases where the user cannot easily understand whether signals that are displayed on the waveform monitor or the like are signals after recording gamma conversion or signals after LUT conversion. In view of this, in this embodiment, an example will be described in which what signal conversion the signals displayed on the external output terminal or the waveform monitor are based on is displayed.

Note that, in this embodiment, as an example, a case will be described in which signals that were subjected to signal conversion are displayed on the waveform monitor included in the display unit 28 that is a video image output unit. However, the video image output unit may be the I/F 18 provided with an external output terminal such as an HDMI (registered trademark) or an SDI, or may be a display panel included in the display unit 28. In addition, in this embodiment, as an example, a case will be described in which two waveform monitors can be displayed, and four input signal switches for the user to designate input signals to the waveform monitors are provided. However, the number of waveform monitors may be one, or three or more, and the number of input signal switches may be other than four.

Note that the configuration of the digital camera of this embodiment is substantially the same as the first to third embodiments except for the configuration of the image processing unit 24, and the operation unit 70 is capable of operations related to a relationship chart displayed on the display unit 28. Therefore, the same reference numerals are assigned to the same configurations, and overlapping description is omitted, and description will be given with a focus on differences.

An exemplary function configuration of the image processing unit 24 according to this embodiment will be described with reference to FIG. 13. Note that the image processing unit 24 includes an input signal change unit 1303 and waveform monitors 1304 and 1305 in addition to the gamma circuit 241, the LUT circuit 242, and the range conversion circuit 243. The input signal change unit 1303 receives input/output signals to/from the gamma circuit 241, the LUT circuit 242, and the range conversion circuit 243, and instruction information from an instruction member 1310 in the operation unit 70. Signals to be input to the waveform monitor 1304 and the waveform monitor 1305 are then selected based on these pieces of information.

The waveform monitor 1304 and the waveform monitor 1305 generate waveform information of signals that are output from the input signal change unit 1303. In addition, a waveform monitor display unit 1311 and a waveform monitor display unit 1312 of the display unit 28 shown in FIG. 13 respectively display waveform information output from the waveform monitor 1304 and the waveform monitor 1305. In addition, the instruction member 1310 in the operation unit 70 shown in FIG. 13 includes input signal switches 1306 to 1309 therein, and receive an instruction through a user operation. The instruction member 1310 inputs information regarding the received user instruction to the input signal change unit 1303. Note that processing for displaying a relationship chart on the display unit 28, and processing for acquiring operation information from the operation unit 70 and changing signal conversion are similar to those of the above embodiments.

Next, signal display processing according to this embodiment will be described with reference to FIG. 12. Note that the signal display processing according to this embodiment is realized by the system control unit 50 loading a program stored in the nonvolatile memory 56 to a work region of the system memory 52, and executing the program, and controlling constituent elements of the digital camera 100 including the image processing unit 24. In addition, this processing is executed after a user interface that includes the relationship chart and the input signal switches 1306 to 1309 is displayed on the display unit 28.

First, an example of a user interface that includes the input signal switches 1306 to 1309, and is displayed when starting signal display processing will be described with reference to FIG. 14. This user interface is displayed for the user to designate input video image signals to be displayed on the waveform monitors, while displaying the relationship of image signals before and after signal conversion that is applied. The input signal switches 1306 to 1309 are instruction members for the user to designate which input video image signal is to be input to a waveform monitor.

Figure 15:
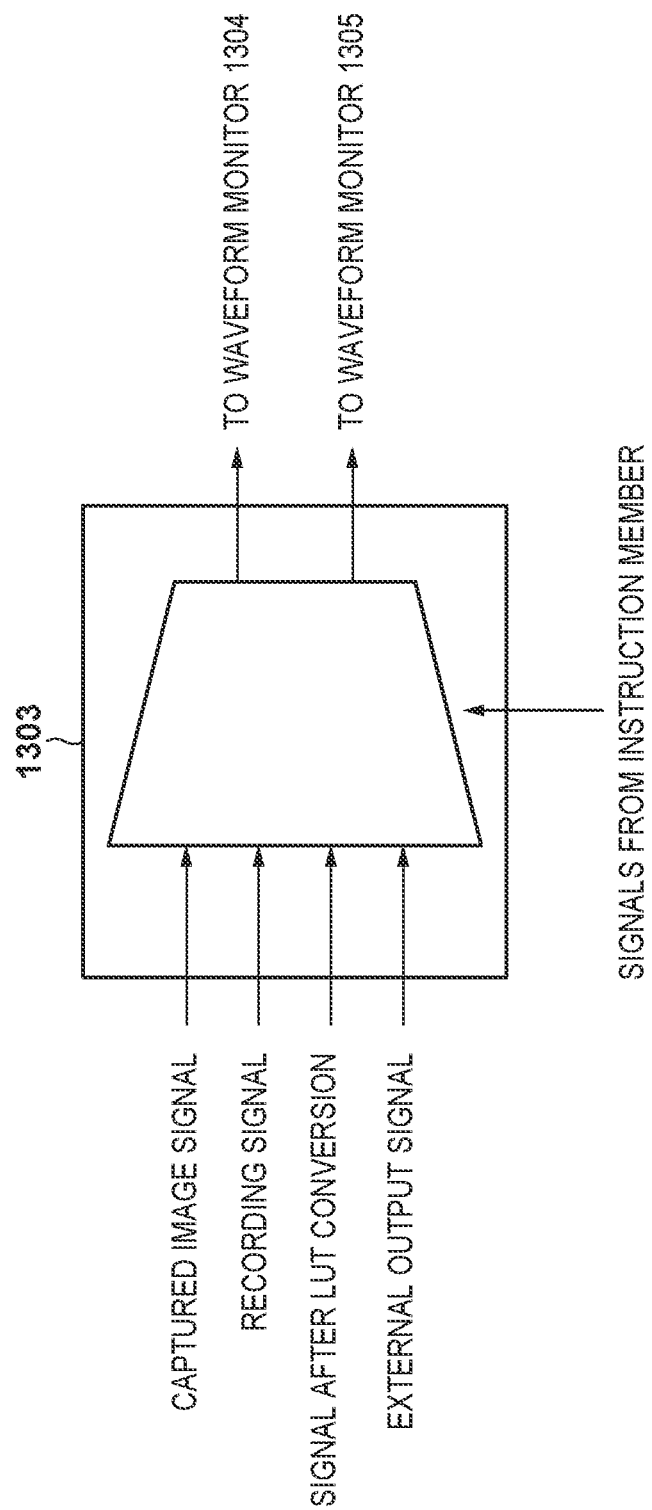
FIG. 15 is a diagram illustrating an input signal change unit in the fourth embodiment.

For example, when one of the input signal switches 1306 to 1309 is designated by the user, input signals are switched following the configuration of the input signal change unit 1303 as shown in FIG. 15, and are input to a waveform monitor. For example, in a case where the user designates the input signal switch 1306, captured image signals are switched to input signals to a waveform monitor by the input signal change unit 1303. In addition, in the case where the user designates the input signal switch 1307, input signals are switched to recording signals, and in the case where the user designates the input signal switch 1308, input signals are switched to signals after LUT conversion, and are input to a waveform monitor. Furthermore, in the case where the user designates the input signal switch 1309, input signals are switched to external output signals, and are input to the waveform monitors.

For example, in the case where the user first designates the input signal switch 1307, and next designates the input signal switch 1308, recording signals are displayed on the waveform monitor display unit 1311 shown in FIG. 14, and signals after LUT conversion are displayed on the waveform monitor display unit 1312. Accordingly, as a result of the user designating signals after each signal conversion indicated in the relationship chart, the waveform of the designated signals can be displayed.

Note that, in the case where the user designates the input signal switches 1307 and 1308, and then designates the input signal switch 1306 and the input signal switch 1309, captured image signals are displayed on the waveform monitor display unit 1311, and external output signals are displayed on the waveform monitor display unit 1312. In addition, in the case where the user designates only one input signal switch, for example, in the case where the user designates only the input signal switch 1307, recording signals are displayed on the waveform monitor display unit 1311, and nothing is displayed on the waveform monitor display unit 1312.

In addition, the system control unit 50 displays, on the display unit 28, information 1406 indicating the relationship between the input signal switch designated by the user and the waveform monitor display unit (which input signal switch the displayed signals correspond to, and which waveform monitor the signals are displayed on).

Next, steps of the signal display processing shown in FIG. 12 will be described specifically. In step S1201, the system control unit 50 acquires information regarding a user operation on the operation unit 70. In step S1202, the system control unit 50 determines whether or not the user has operated one of the input signal switches 1306 to 1309. If the system control unit 50 determines, based on operation information, that none of the input signal switches has been operated, the procedure advances to step S1206, and if it is determined that one of the input signal switches has been operated, the procedure advances to step S1203. In step S1206, the system control unit 50 causes the input signal change unit 1303 to input signals of default setting to a waveform monitor. The signals of default setting are recording signals and signals after LUT conversion, for example, but may be other signals, and may be captured image signals or external output signals.

In step S1203, the system control unit 50 analyzes, based on the operation information, which input signal switch the user has designated. Subsequently, in step S1204, the system control unit 50 causes the input signal change unit 1303 to select signals from captured image signals, recording signals, signals after LUT conversion, and external output signals, according to a signal from the instruction member 1310, and to input the selected signals to a waveform monitor.

In step S1205, the system control unit 50 causes the waveform monitor display unit 1311 and the waveform monitor display unit 1312 to display the input signals from the input signal change unit 1303.

As described above, in this embodiment, in addition to the relationship of image signals before and after signal conversion that is applied, a user interface that includes waveform monitors and operation members for selecting input video image signals to be displayed on the waveform monitors is displayed. With such a configuration, in the case where a plurality of signal conversions can be performed, the user can easily understand and check which signal conversion the signals displayed on the waveform monitor or the like have been subjected to. In addition, the user can easily check the waveform of the signals that have been subjected to applied signal conversion, while checking the relationship of image signals before and after the signal conversion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099016, filed May 23, 2018, which is hereby incorporated by reference herein in its entirety.

What is claimed is:

1. An image processing apparatus comprising:
   a conversion unit configured to convert a characteristic of an image signal; and
   a display control unit configured to generate information indicating a relationship of image signals before and after conversion is performed by the conversion unit, and cause a display to display the information indicating a relationship of image signals,
   wherein the display control unit generates the information indicating a relationship of image signals, so as to include information indicating a relationship of scales of signals before and after conversion and information indicating a relationship of signal values before and after conversion.

2. The image processing apparatus according to claim 1, wherein
   in a case where the conversion unit performs a plurality of conversions, the display control unit generates the information indicating a relationship of image signals, so as to include the information indicating a relationship of scales of signals before and after each of the conversions and the information indicating a relationship of signal values before and after each of the conversions.

3. The image processing apparatus according to claim 1, wherein
   the information indicating a relationship of image signals includes information indicating at least one of transition of the scales of signals before and after conversion, transition of the signal values before and after conversion, and a correspondence relationship of signal values between the scales of signals before and after conversion.

4. The image processing apparatus according to claim 1, wherein
   the display control unit generates the information indicating a relationship of image signals, so as to include a maximum signal value before conversion is performed by the conversion unit and a maximum signal value after conversion is performed by the conversion unit.

5. The image processing apparatus according to claim 1, wherein
   a scale of a signal before conversion is performed by the conversion unit and a scale of a signal after conversion is performed by the conversion unit are scales having different gradation characteristics.

6. The image processing apparatus according to claim 5, wherein
   the scale of a signal indicates one of a dynamic range of an image signal when it is acquired through image capturing, luminance that indicates brightness when an image signal is displayed on a display, and a predetermined signal range defined by a signal value corresponding to a black signal and a signal value corresponding to a white signal.

7. The image processing apparatus according to claim 1, further comprising:
   an acquisition unit configured to acquire a predetermined region of image signals displayed on the display,
   wherein the display control unit generates the information indicating a relationship of image signals such that the information indicating a relationship of image signals includes information indicating a relationship of signal values before and after the conversion, with respect to the predetermined region.

8. The image processing apparatus according to claim 1, further comprising:
   an operation unit configured to receive an operation content of a user operation for changing a characteristic of an image signal; and
   a control unit configured to change a conversion operation of the conversion unit based on the operation content.

9. The image processing apparatus according to claim 8, wherein
   before changing the conversion operation of the conversion unit based on the operation content, the control unit determines whether or not the conversion unit can perform conversion that is based on the operation content, and
   wherein, if it is determined that the conversion that is based on the operation content cannot be performed, the display control unit displays a warning to a user that the conversion that is based on the operation content cannot be performed.

10. The image processing apparatus according to claim 2, wherein
    in a case where the conversion unit performs a plurality of conversions, the display control unit adds, to the information indicating a relationship of image signals, a waveform monitor for displaying a waveform of an image signal and an operation member for selecting image signals related to a conversion that is to be displayed on the waveform monitor, and switches display of the waveform monitor based on selection on the operation member.

11. A control method of an image processing apparatus comprising:
    converting a characteristic of an image signal; and
    performing display control for generating information indicating a relationship of image signals before and after conversion is performed in the converting, and causing a display to display the information indicating a relationship of image signals,
    wherein, in the display control, the information indicating a relationship of image signals is generated so as to include information indicating a relationship of scales of signals before and after conversion and information indicating a relationship of signal values before and after conversion.

12. A non-transitory computer-readable storage medium storing a program for causing a computer to execute a control method of an image processing apparatus comprising:
    converting a characteristic of an image signal; and
    performing display control for generating information indicating a relationship of image signals before and after conversion is performed in the converting, and causing a display to display the information indicating a relationship of image signals;
    wherein, in the display control, the information indicating a relationship of image signals is generated so as to include information indicating a relationship of scales of signals before and after conversion and information indicating a relationship of signal values before and after conversion.

* * * * *